US011599547B2

(12) United States Patent
Patel et al.

(10) Patent No.: US 11,599,547 B2
(45) Date of Patent: *Mar. 7, 2023

(54) DATA REPLICATION AND SITE REPLICATION IN A CLUSTERED COMPUTING ENVIRONMENT

(71) Applicant: SPLUNK INC., San Francisco, CA (US)

(72) Inventors: Vishal Patel, San Francisco, CA (US); Mitchell Neuman Blank, Jr., San Francisco, CA (US); Sundar Renegarajan Vasan, San Francisco, CA (US); Stephen Phillip Sorkin, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/230,646

(22) Filed: Apr. 14, 2021

(65) Prior Publication Data
US 2021/0279244 A1  Sep. 9, 2021

Related U.S. Application Data

(63) Continuation of application No. 16/444,593, filed on Jun. 18, 2019, now Pat. No. 11,010,390, which is a
(Continued)

(51) Int. Cl.
*G06F 16/2457* (2019.01)
*G06F 16/9537* (2019.01)
(Continued)

(52) U.S. Cl.
CPC ...... *G06F 16/24575* (2019.01); *G06F 11/20* (2013.01); *G06F 11/2094* (2013.01);
(Continued)

(58) Field of Classification Search
CPC .............. G06F 16/24575; G06F 11/20; G06F 11/2094; G06F 16/2272; G06F 16/27;
(Continued)

(56) References Cited

U.S. PATENT DOCUMENTS 8,438,277 B1 * 5/2013 Chepuri ............ H04L 41/0654
709/224
2010/0005151 A1 * 1/2010 Gokhale ............ G06F 16/2272
709/216
(Continued)

*Primary Examiner* — Albert M Phillips, III
(74) *Attorney, Agent, or Firm* — Artegis Law Group, LLP

(57) ABSTRACT

A method of data replication in a clustered computing environment comprises receiving, at a selected indexer within a plurality of indexers in a cluster, data from a forwarder indexer, wherein the selected indexer is designated as a primary indexer for the data, wherein the primary indexer has primary responsibility for responding to search queries pertaining to the data, wherein the cluster comprises a plurality of sites. The method further comprises receiving, at the selected indexer, data replication instructions, wherein the data replication instructions comprise a number of other indexers in the cluster for storing a replicated copy of the data and further comprise a number of sites from the plurality of sites across which to store a replicated copy of the data determined in accordance with a site replication factor.

20 Claims, 18 Drawing Sheets

Related U.S. Application Data continuation of application No. 15/967,385, filed on Apr. 30, 2018, now Pat. No. 10,474,682, which is a continuation of application No. 14/815,974, filed on Aug. 1, 2015, now Pat. No. 9,984,129, which is a continuation of application No. 14/266,812, filed on Apr. 30, 2014, now Pat. No. 9,130,971, which is a continuation-in-part of application No. 13/648,116, filed on Oct. 9, 2012, now Pat. No. 8,788,459.

(60) Provisional application No. 61/647,245, filed on May 15, 2012.

(51) Int. Cl.
*G06F 16/9535* (2019.01)
*G06F 16/22* (2019.01)
*G06F 16/27* (2019.01)
*G06F 16/29* (2019.01)
*H04L 67/1097* (2022.01)
*G06F 11/20* (2006.01)
*G06F 3/06* (2006.01)

(52) U.S. Cl.
CPC .......... *G06F 16/2272* (2019.01); *G06F 16/27* (2019.01); *G06F 16/275* (2019.01); *G06F 16/29* (2019.01); *G06F 16/9535* (2019.01); *G06F 16/9537* (2019.01); *H04L 67/1097* (2013.01); *G06F 3/065* (2013.01); *G06F 3/067* (2013.01); *G06F 3/0617* (2013.01)

(58) Field of Classification Search
CPC .... G06F 16/275; G06F 16/29; G06F 16/9535; G06F 16/9537; G06F 3/0617; G06F 3/065; G06F 3/067; H04L 67/1097
See application file for complete search history.

(56) References Cited

U.S. PATENT DOCUMENTS

2011/0060716 A1\* 3/2011 Forman ................. G06F 16/954
706/54
2012/0278344 A1\* 11/2012 Berg ................. G06F 16/24552
707/754

\* cited by examiner

DATA REPLICATION AND SITE REPLICATION IN A CLUSTERED COMPUTING ENVIRONMENT

CROSS-REFERENCE TO RELATED APPLICATIONS

This application claims benefit under 35 U.S.C. § 120 as a Continuation of U.S. application Ser. No. 16/444,593, filed on Jun. 18, 2019, which claims benefit as a Continuation of U.S. application Ser. No. 15/967,385, now issues as U.S. Pat. No. 10,474,682, which claims benefit as a Continuation of U.S. application Ser. No. 14/815,974, now issued as U.S. Pat. No. 9,984,129, which claims benefit as a Continuation of U.S. application Ser. No. 14/266,812, filed on Apr. 30, 2014, now issued as U.S. Pat. No. 9,130,971, which claims benefit as a Continuation-in-part of U.S. application Ser. No. 13/648,116, filed on Oct. 9, 2012, now issued as U.S. Pat. No. 8,788,459, which claims the benefit of U.S. Provisional Application 61/647,245, filed May 15, 2012. This application is also related to U.S. application Ser. No. 13/662,358, now issued as U.S. Pat. No. 9,160,798, filed on Oct. 26, 2012. The entire contents of each of the above-listed applications is hereby incorporated by reference for all purposes as if fully set forth herein.

FIELD OF THE DISCLOSURE

The disclosed embodiments relate generally to managing data storage and recovery and, more particularly, but not exclusively, to managing within a cluster environment data storage using data replication and generation identifiers for data storage and recovery.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today's Internet has evolved into a ubiquitous network that has compelled many businesses to rely upon it as a major resource for doing business. For example, many businesses may employ services on the Internet to perform backup of their various aspects of their local computing resources, including providing for high availability of backed up data.

In response to the need to provide for a networking infrastructure with both high availability of data and recover from disasters, cluster architectures were developed. Briefly, a cluster architecture can be defined as multiple loosely coupled network devices that cooperate to provide client devices access to one or more services over the network.

However, some cluster architectures that are employed for data backup may spread different portions of data across a large number of members within the cluster to minimize the likelihood of loss of large amounts of data should one of the members fail. However, when loss of even a portion of the data may be significant to the clients depending upon the cluster, this may not be a tolerable result. Therefore, It is with respect to these considerations and others that the present invention has been made.

The performance and capabilities of computing devices have increased dramatically since their introduction. However, computing devices of all types remain susceptible to device failures, whether from malfunctioning device hardware or from external conditions such as a loss of electrical power. For businesses and users that rely on computing devices, such failures can result in highly undesirable downtime and possible data loss.

For some computing environments, a cluster architecture may be configured to mitigate some of the problems caused by device failures. In general, a cluster consists of multiple computing devices that may be connected by a network and that operate in a coordinated fashion to provide access to data and/or one or more computing services. In order to provide for high data availability and the ability to recover from disasters, a cluster architecture may be configured to replicate data stored by the cluster across multiple components of the cluster. In this manner, if one or more of the cluster components fails, data stored by the failed components may be made available through one or more of the other components storing a replicated copy of the data.

Some cluster architectures that are employed for data backup may spread different portions of data across a large number of components within the cluster to minimize the likelihood of losing large amounts of data should one or more of the components fail. However, when loss of even a portion of the data may be significant, this may not be a tolerable result.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
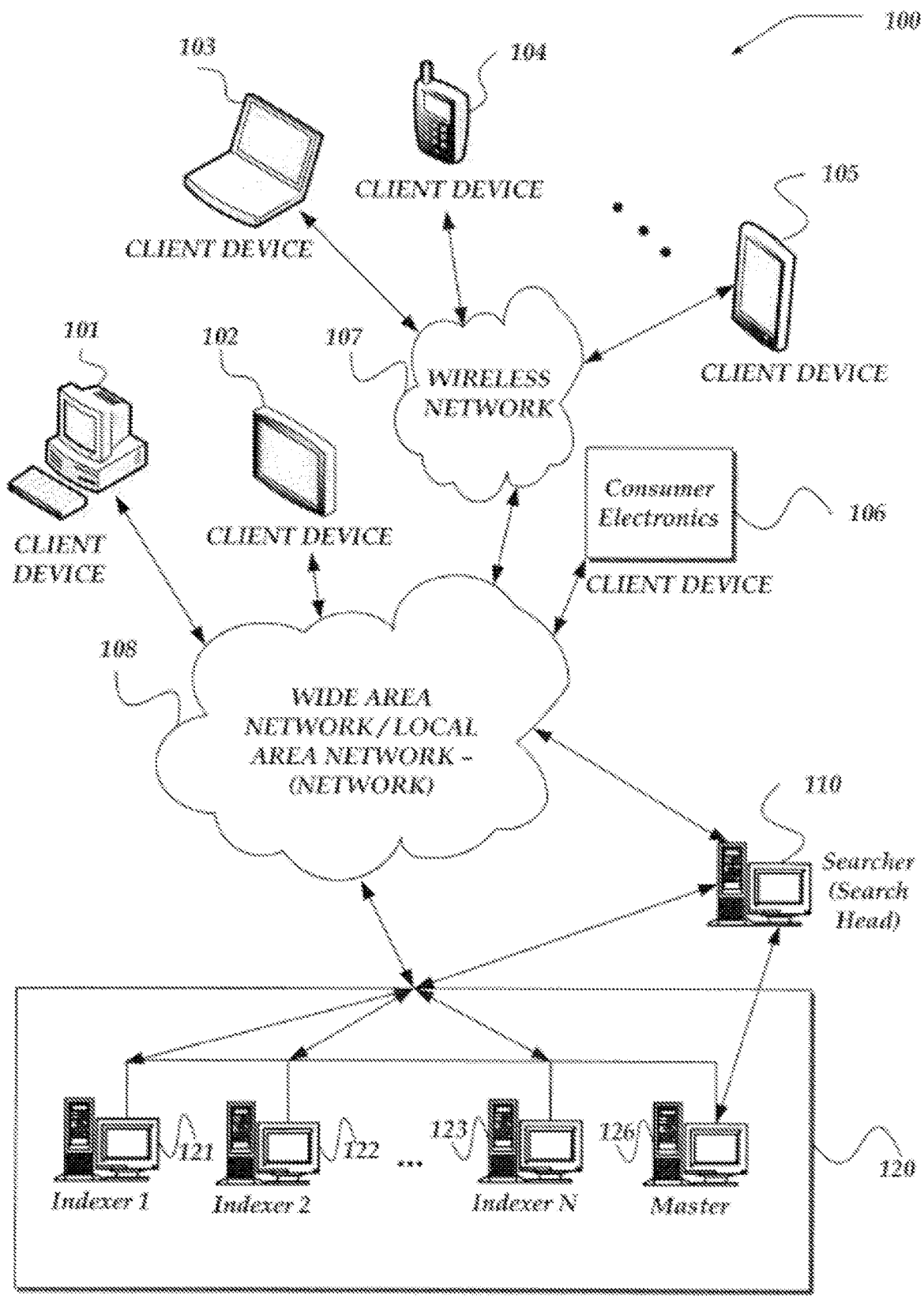
FIG. 1 illustrates a system diagram of one embodiment of an environment in which the embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Operating Environment
3.0 General Operation
4.0 Clustered Operating Environment
5.0. Multi-Site Clusters
6.0 Site-Based Search Affinity
7.0. Implementation Mechanisms—Hardware Overview
8.0. Example Embodiments
9.0. Extensions and Alternatives

1.0. General Overview

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the various embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly provides a simplified summary of the subject innovations in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, subject innovations are directed towards managing data backup and access within a cluster environment having a plurality of member indexers using storage redundancy (or replication). Although described in more detail below, an indexer is any computing device arranged to store and retrieve data. A member indexer may be selected as a primary source for data storage by a forwarder device that is external to the cluster, where briefly, a forwarder device is any computing device configured to produce, discover, or collate data and then send the data to an indexer.

In one embodiment, the data may be stored in what is herein termed "buckets." In any event, the forwarder device may, in one embodiment, operate within a client device. In one embodiment, the forwarder device may employ a load balancing algorithm to select the member indexer to which to send data. In one embodiment, each forwarder device within a plurality of forwarder devices may select an indexer independent of another forwarder device. The forwarder device may, in one embodiment, specify a number of copies or a number of times the data is to be replicated for data recovery, herein termed a "replication factor." However, in other embodiments, the replication factor may be configured on an indexer based on a variety of factors, including, a type of data to be replicated. In any event, the selected indexer may generate a journal about the received data, including metadata, usable to rebuild the data. The journal and data may then be sent to one or more other member indexers for replication. In one embodiment, the selected indexer may be designated as a primary member indexer for the received data. In one embodiment, a cluster master may identify a number of other member indexers that may be secondary indexers for the data based, in part, on availability to receive and to save replicates of the data. The number of secondary indexers selected corresponds to the number of desired replications indicated by the forwarder device. In one embodiment, the secondary indexers may also be called "shadow" indexers. Moreover, in at least one embodiment, the data being saved may be termed a "slice of data." Further, a member indexer may be designated primary (or secondary) for one bucket of data, and secondary (or primary) for a different bucket of different data. Thus, in one embodiment, a bucket on an indexer may be considered primary for some requests, such as for example, searches originating from the east coast, while being designated as secondary for other requests, such as searches originating from the west coast, or the like.

The primary indexer provides an Acknowledgement (ACK) message to the forwarder device to indicate that the received data has been received and saved. ACK messages may be received by the primary indexer from the secondary indexers to indicate that they respectively received and saved the data for replication. Failure to return an ACK to the forwarder when initially sending data may result in the forwarder device selecting a different indexer. Failure to return an ACK by a secondary indexer to the primary may result in either resending of the data to the secondary, or a selection of another secondary, as appropriate.

Transitions of a primary indexer for a given bucket, either due to a planned or an unplanned event, is managed using a generation identifier (GEN_ID) that indicates a particular time based set of the data. Thus, an indexer may be designated as primary for a given bucket for GEN_ID of, say zero, but a different indexer may be primary for the bucket at a different GEN_ID of, say one. Further, a bucket on an indexer may be primary for different types of searches at different GEN_IDs. The GEN_ID then may be a point at which these "primacy' decisions can be changed. Thus, as an aside, for example, at GEN_ID equal to say 100, bucket A on indexer 1 may be primary—for everything, and bucket A on indexer 2 is secondary. Then, at GEN_ID equal to 150, these roles may change, where bucket A on indexer 1 is primary for east coast searches, and secondary for west coast searches, while indexer 2 is then the opposite: primary for west coast searches and secondary for east coast searches. Further, at GEN_ID of 200, this may change again, where bucket A on indexer 1 is secondary for all searches, and indexer 2's bucket A is primary for all searches. Thus, at every generation, every bucket's primacy settings may be set so every search will visit each bucket once. For example, this invariant might be violated if bucket A were simultaneously primary for all searches on indexer 1 and primary for east coast searches on indexer 2. Then a search coming from the east coast would get data from bucket A twice. This is prevented however, by monitoring the GEN-ID, when the GEN_IDs new primacy rules can be in effect.

In any event, in one embodiment, GEN_ID may be a monotonically increasing counter. Moreover, in one embodiment, GEN_ID may be global across all buckets of stored data by the cluster.

In one embodiment, search requests, retrieval of stored data, or any of a variety of data recovery requests may be initiated by a searcher device, sometimes referred to as a "search head." In one embodiment, the searcher device may reside within a client device, or be another device accessed by the client device. In one embodiment, the searcher device may be external from the cluster. In any event, a request may include information, including a GEN_ID, indicating which generation of data is being requested. In one embodiment, the GEN_ID may be obtained by the searcher device from the master device.

In one embodiment, the request may be broadcast to all of the member indexers. However, the request may be ignored by secondary indexers for that GEN_ID. The primary indexer for that GEN_ID responds to the request for the data. Moreover, because secondary indexers do not respond to the request, a search request does not receive multiple responses of the same data. Should the primary indexer fail, or otherwise fail to respond to the request, in one embodiment, a master device may designate one of the secondary indexers as a primary that may then respond to the request. In one embodiment, the new primary indexer may also be designated as the primary indexer for storing of data associated with an incremented GEN_ID. Subsequent requests for data may then employ the new GEN_ID.

In one embodiment, member indexers may store different 'slices' of data having different GEN_IDs. Moreover, as disclosed further below, the cluster environment with member indexers may be minimally impacted by a master failure. That is, because the forwarder device selects the member indexer to receive data for storage and replication distribution, the forwarder device need not interact with the master device. Indexers may operate to receive and/or distribute for replication and storage, data, journals, or the like, independent of the master device. Further, although the master device manages GEN_IDs for data, requests for data may employ earlier GEN_ID numbers and therefore are also minimally impacted by a master device failure. Although a master device may be aware of which indexer is primary or secondary for each bucket of data being managed in the system, the master device does not manage the data or the state of the data per se, as the state of the data is also known by each of the member indexers in the aggregate. Therefore, if the master device is unavailable for some amount of time, availability of data reception, indexing, and searching are not immediately impacted. However, in one embodiment, the master device may manage not only the GEN_ID transition updates, but may also re-assign, as appropriate, replication indexers when a member indexer fails.

According to various embodiments, techniques are described for managing data within a multi-site clustered data intake and query system. A data intake and query system as described herein generally refers to a system for collecting, retrieving, and analyzing data such as machine-generated data. A clustered data intake and query system generally refers to a system environment that provides data redundancy and other features to improve the availability of data stored by the system. For example, a clustered data intake and query system may be configured to store multiple copies of data stored by the system across multiple components such that recovery from a failure of one or more of the components is possible by using copies of the data stored elsewhere in the cluster.

However, if all components of a cluster are co-located at the same geographic location, or if the cluster includes geographically dispersed components but data is not replicated across different geographic locations, a cluster may nevertheless be susceptible to site-wide failures. In one embodiment, to further improve the resiliency of a cluster against site-wide failures, a cluster may be configured such that various components of the cluster are located at multiple different sites and data is replicated across components at different sites. A "site" in this context may refer to a logical and user-configurable grouping of one or more cluster components that may each be associated with a particular geographic location. For example, a particular defined site may represent a collection of cluster components that are housed at an individual data center, office building, or other facility at a distinct geographic location. By configuring a cluster with two or more geographically dispersed sites, data replication policies may be defined that ensure that all data in the system is replicated across cluster components located at multiple sites, thereby providing the cluster with additional resiliency against site-wide failures within the cluster.

In one embodiment, the components of a multi-site clustered data intake and query system may include one or more "indexers." Each indexer generally represents a computing resource that is configured to process, index, and store data and to retrieve subsets of the data in response to search requests. Because the data of a cluster may be stored across a number of indexers, search requests against data stored in a cluster may be distributed to several indexers within the cluster for processing. In one embodiment, a cluster component referred to as a "search head" may be responsible for distributing searches across multiple indexers of a cluster and collating the results.

A multi-site cluster may include one or many search heads, and each search head generally may be located at any site of the cluster. Because the data of a cluster may be stored on indexers that span multiple sites, a search head may distribute a search query to indexers associated with the same site as the search head as well as indexers located at other sites. Depending on a number of different sites configured in a multi-site cluster, and the quality of the network connections between the different sites, a search head may experience undesirable network latency when retrieving a large number of results from indexers located at sites that are different from the search head. In one embodiment, to reduce network latency associated with retrieving results from indexers located at sites that are different from the site from which a search originates, "search affinity" information may be used by indexers of a multi-site cluster to increase the likelihood that search results for a search query originating from a search head of a particular site are satisfied by indexers located at the same site. In an embodiment, search affinity information indicates, for each subset of data stored by an indexer and that may be replicated across other indexers at multiple sites, whether the indexer is responsible for returning results from the subset of data for searches originating from particular sites. By controlling when each indexer returns results from each subset of data stored by the indexer depending on where a search request originates, preference may be given to indexers that are located at the same site at which a search originates, thereby decreasing the likelihood that a search head is retrieving results from other geographically dispersed sites.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0 Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 108, wireless network 107, client devices 101-106, searcher device 110, and cluster 120. Cluster 120 includes a plurality of cluster member indexers 121-123, and master device 126.

One embodiment of client devices 101-106 is described in more detail below in conjunction with FIG. 2. In one embodiment, at least some of client devices 101-106 may operate over a wired and/or a wireless network such networks 107 and 108. As shown, client device 101 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. Also, client device 102 may include virtually any device usable as a video display device, such as a television, display monitor, display screen, projected screen, and the like. Additionally, client device 106 may include any kind of Consumer Electronic device, e.g., a Blu-ray player, DVD player, CD player, portable music playing device, portable display projector, and the like. Moreover, client devices 101-106 may provide access to various computing applications, including a browser, or other web-based application.

Generally, however, client devices 101-106 may include virtually any portable computing device capable of receiving and sending messages over a network, accessing and/or playing content, such as network 108, wireless network 107, or the like. Further, client devices 103-105 may include virtually any portable computing device capable of connecting to another computing device and receiving information such as, laptop computer 103, smart phone 104, and tablet computers 105, and the like. However, portable computer devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 101-106 typically range widely in terms of capabilities and features.

A web-enabled client device may include a browser application that is configured to receive and to send web pages, web-based messages, and the like. The browser application may be configured to receive and display graphics, text, multimedia, media content, and the like, employing virtually any internet based and/or network-based protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of a client device may employ the browser application to perform various activities over a network (online). However, another application may also be used to perform various online activities.

Client devices 101-106 also may include at least one other client application that is configured to receive and/or send content between another computing device. The client application may include a capability to send and/or receive content, or the like. The client application may further provide information that identifies itself, including a type, capability, name, and the like. In one embodiment, client devices 101-106 may identify themselves as part of a class of devices. In another embodiment, client devices 101-106 may uniquely identify themselves through any of a variety of mechanisms, including a phone number, Mobile Identification Number ("MIN"), an electronic serial number ("ESN"), Internet Protocol (IP) Address, network address, or other mobile device identifier. The information may also indicate a content format that the mobile device is enabled to employ. Such information may be provided in a network packet, or the like, sent between other client devices, searcher device 110, and/or any one or more of member indexers 121-123, master device 126, or other computing devices. Moreover, it should be readily understood that devices and/or components within a device that is communicating with a client device may also identify themselves using any of a variety of mechanisms, including those used by the client device.

Client devices 101-106 may further be configured to include a client application that enables an end-user to log into an end-user account that may be managed by another computing device. Such end-user account, in one non-limiting example, may be configured to enable the end-user to manage one or more online activities, including in one non-limiting example, search activities, social networking activities, browse various websites, communicate with other users, or the like.

Moreover, in one embodiment, client devices 101-106 may include an application described further below as a forwarder. In one embodiment, the forwarder application may enable a client device to operate as a forwarder device to provide data to one or more members of cluster backup. As described below, the forwarder device may select an indexer within cluster 120 based on any of a variety of mechanisms, to receive the data for backup and to manage replication of the data based on a provided replication factor. Forwarder devices may make the selection based on a load-balancing algorithm, including a least loaded algorithm, a fastest response algorithm, a round-robin, random selection, or any of a variety of other mechanisms. Should the selected member indexer fail to provide an acknowledgement in response to receiving data from the forwarder device for storage, the forwarder device may elect to select a different indexer to manage the data storage and replication. In one embodiment, the forwarder device may receive information about the available member indexers 121-123 from master device 126.

Client devices 101-106 may also interact with searcher device 110 for recovery of data, to perform search queries on stored data, or any of a variety of other queries of data stored and replicated by cluster 120.

Thus, searcher device 110 may be virtually any network device that is configured to perform search, recovery, or other operations upon the data managed by cluster 120. In one embodiment, searcher device 110 may obtain information from master device 126 indicating a current GEN_ID for data for which searcher device 110 is to request. In some embodiments, the searcher device 110 may also receive a list of indexers to contact. Searcher device 110 may then send a request for such data to cluster 120 that may include requests for multiple sets of data and the GEN_ID from which to obtain the data. Searcher device 110 receives from a designated primary member indexer within cluster 120 for the requested data and GEN_ID. In one embodiment, searcher device 110 may perform various actions on the received data, and/or provide the data to one or more client devices.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 101-106. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 101-106 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, cluster 120, and searcher device 110, and through wireless network 107 to client devices 103-105. Network 108 is enabled to employ any form of network mechanism for communicating information from one electronic device to another. Also, network 108 can include the Internet in addition to LANs, WANs, direct connections, such as through a universal serial bus ("USB") port, other forms of network mechanism, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, network mechanisms by way of example, network mechanisms include wired media such as twisted pair, coaxial cable, fiber optics, wave guides, and other wired media and wireless media such as acoustic, RF, infrared, and other wireless media.

Cluster 120 typically is configured to include loosely coupled network devices that may cooperate to provide another device with access to a service, resource, and the like. In one embodiment, cluster 120 is configured to manage data storage and replication of data received by one or more client devices operating as forwarder devices.

One embodiment, of a cluster member indexer is disclosed in more detail below in conjunction with FIG. 3. Briefly, however, cluster 120 includes a plurality of member indexers 121-123, and master device 126. While master device 126 is illustrated as a separate device from member indexers 121-123, it should be understood that other embodiments are not so constrained. For example, one of member indexers 121-123 may also be configured to operate and perform functions of master device 126 as well as operating to perform functions of an indexer device. Further, should master device 126 fail or otherwise be determined to be non-responsive, any one or more of member indexers 121-123 may elect one of the member indexers 121-123 to become a master device. Such election may be performed using any mechanism, including a priority selection, a least loaded selection, a random selection, or the like.

Further, each of member indexers 121-123 and master device 126 are configured to communicate with each other to send messages, determine a status of another device within cluster 120, respond to requests for status or other information, or the like. For example, based on a timer, or other algorithm member indexers 121-123 and master device 126 may send out a ping or other status request to one or more of the other devices within cluster 126. As used herein, a ping may represent any message sent out this is arranged to expect to receive a response. In this manner, a failure to respond to the status request (or ping) may indicate that the device not responding has failed. Then based on which device is determined to have failed, master device 126 or one of the member indexers 121-123 may assume the functions of the failed device.

In one embodiment, master device 126 may be any network device that is configured to monitor status of the member indexers 121-123, assign GEN_IDs, and indicate available indexers useable as secondary indexers for data storage/replication. Master device 126 may also provide information to client devices 101-106 and/or searcher device 110, including information about indexers available for storing data, GEN_IDs and updates to GEN_IDs, and the like. Master device 126 may also coordinate planned and unplanned transitions of indexers from secondary indexer status to primary indexer status for a given bucket or buckets of data. While master device 126 may maintain status of which indexers are primary, secondary, is storing what data for a given GEN_ID, master device 126 need not touch or otherwise manage the data or journals about the data. Master device 126 may perform other actions as described herein.

Member indexers 121-123 represent elements of the described embodiments that may index and store data and events, and provide replication of the data and events. Indexers 121-123 may collect, parse, and store data to facilitate fast and accurate information retrieval. Index design for storage may incorporate interdisciplinary concepts from linguistics, cognitive psychology, mathematics, informatics, physics, and computer science. Also, indexes may reside in flat files in a data store on a file system. Index files may be managed to facilitate flexible searching and fast data retrieval, eventually archiving them according to a configurable schedule, request, or the like. During indexing, incoming raw data from, for example, a forwarder device, may be processed to enable fast search and analysis, the results of which may be stored in an index, or bucket. As part of the indexing process, the indexer 121-123 may add knowledge to the data in various ways, including by: separating a data stream into individual, searchable events; creating or identifying timestamps; extracting fields such as host, source, and source type; performing user-defined actions on the incoming data, such as identifying custom fields, masking sensitive data, writing new or modified keys, applying breaking rules for multi-line events, filtering unwanted events, and routing events to specified indexes or servers, and the like. In one embodiment, indexers 121-123 may also generate journals of the received raw data that provides meta-data about the raw data, and/or other information that may be useable for building and/or otherwise regenerating portions of the raw data or information about the raw data.

Indexers 121-123 may be selected as a primary indexer for at least a portion of the received data and manage that data in buckets as described further below in conjunction with FIG. 4. A designated primary indexer may provide acknowledgements to a forwarder device indicating that the received data has been received and/or has been stored in a bucket. A designated primary indexer may further generate a journal about the received data. In one embodiment, the designated primary indexer may then send the data and journal to one or more other indexers to be replicated. The primary indexer may further resend the data or send the data to a different indexer for replication based on whether or not an acknowledgement is received from the secondary indexer(s).

While indexers 121-123 are illustrated within cluster 120, as residing on different network devices, other embodiments are not so constrained. In another embodiment, each indexer may reside with a blade server architecture. Generally, a blade server is a stripped down server computing device with a modular design optimized to minimize a use of physical space and energy. A blade enclosure can include several blade servers and provide each with power, cooling, network interfaces, input/output interfaces, and resource management. A plurality of blade servers may also be included in one enclosure that shares resources provided by the enclosure to reduce size, power, and/or cost.

Moreover, indexers 121-123 need not be physically collocated. Thus, for example, indexer 121 may reside in California, while indexers 122-123 might reside on the east coast of America, or the like. Clearly, other variations are also envisaged. Moreover, while three indexers are illustrated, cluster 120 may include many more or less indexers than illustrated.

Illustrative Client Device

Figure 2:
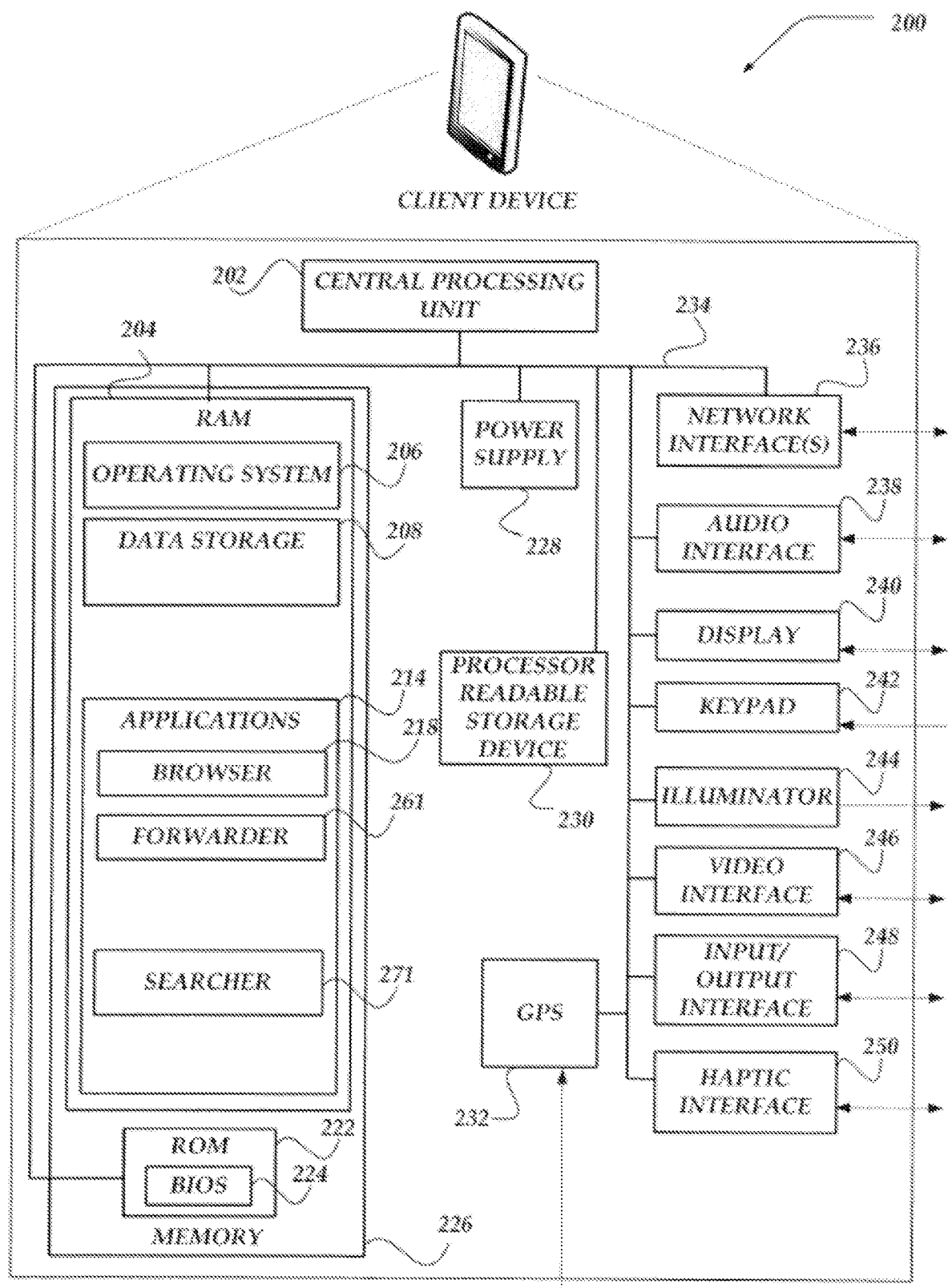
FIG. 2 illustrates one possible embodiment of a client device usable within the environment of FIG. 1.

FIG. 2 shows one embodiment of client device 200 that may be included in a system implementing the invention. Client device 200 may represent any of a variety of platforms useable to perform actions as disclosed within. Client device 200 may include many more or less components than those shown in FIG. 2. However, the components shown are sufficient to disclose an illustrative embodiment for practicing the present invention. Client device 200 may represent, for example, one embodiment of at least one of client devices 101-106 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and a global positioning systems ("GPS") receiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wired and/or wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Moreover, display 240 may be configured to employ any of a variety of network connection types, including, but not limited to High-Bandwidth Digital Content Protection (HDCP) connection types, Display Port (DP), Digital Visual Interface (DVI), and High-Definition Multimedia Interface (HDMI), as well as Gigabit Video Interface (GVIF), Standard-definition (SD), Unified Display Interface (UDI). At least some of these network connection types provide a form of digital copy protection. A detection of whether display 240 is connected through one of these, or other types, of network connection types may be determined using a variety of techniques, including signature transmissions, protocol handshakes, authentication procedures, or the like. Changing usage of a network connection type may indicate a change in a level of trust of at least one component of client device 200.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAT"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store various raw data to be sent to cluster 120 for storage. At least a portion of the information may also be stored on another component of network device 200, including, but not limited to computer readable storage device 230, a disk drive or other computer-readable storage device (not shown) within client device 200.

Applications 214 may include computer executable instructions which, when executed by client device 200, transmit, receive, and/or otherwise process messages (e.g., SMS, Multimedia Message Service ("MMS"), instant messages ("IM"), email, and/or other messages), audio, video, and enable telecommunication with another user of another client device. Other examples of application programs include calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218, searcher 271, and forwarder 261.

Browser 218 may include virtually any application configured to receive and display graphics, text, multimedia, and the like, employing virtually any web based protocol. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to provide and/or receive data from another computing device, such as cluster 120, and/or searcher device 110 of FIG. 1.

Forwarder 261 may enable client device 200 to operate as a forwarder device to prepare and send data about various actions of client device 200, to cluster 120 of FIG. 1 for storage. Forwarder 261 may collect the data, in real-time, and/or non-real-time. Forwarder 261 may query master device 126 for information about available indexers within cluster 120 that may be available for storage of data. In one embodiment, forwarder 261 may receive address information about the indexers to enable forwarder 261 to send data.

Forwarder 261 may select an indexer to receive the data based on any of a variety of criteria, including, but not limited to a load-balancing algorithm. In one embodiment, selection of an indexer may result in that indexer becoming a primary indexer for that data. In one embodiment should forwarder 261 not receive an acknowledgement from at least the primary indexer in response to sending data, forwarder 261 may select a different indexer in which to send data.

In one embodiment, forwarder 261 may specify an amount of space for storing of the data, and/or may specify a replication factor indicating a number of times the data is to be replicated. However, in other embodiments, the replication factor might be configured on an indexer based on, for example, a type of data being replicated. Forwarder 261 may also indicate when to close a bucket for data, open a new bucket, or the like.

Searcher 271 may perform functions described above for searcher device 110 of FIG. 1. Thus, in one embodiment, searcher 271 may operate local to client device 200 to enable client device 200 to perform searches, data recovery, or other actions upon the data provided to indexers through at least forwarder 261. In one embodiment, searcher 271 may obtain status information from master device 126 including a GEN_ID for data of interest by searcher 271. Searcher 271 may then send a request for the data to cluster 120 along with a GEN_ID. Searcher 271 then receives a response that from one or more primary indexers associated with the requested data and GEN_ID.

Illustrative Network Device

Figure 3:
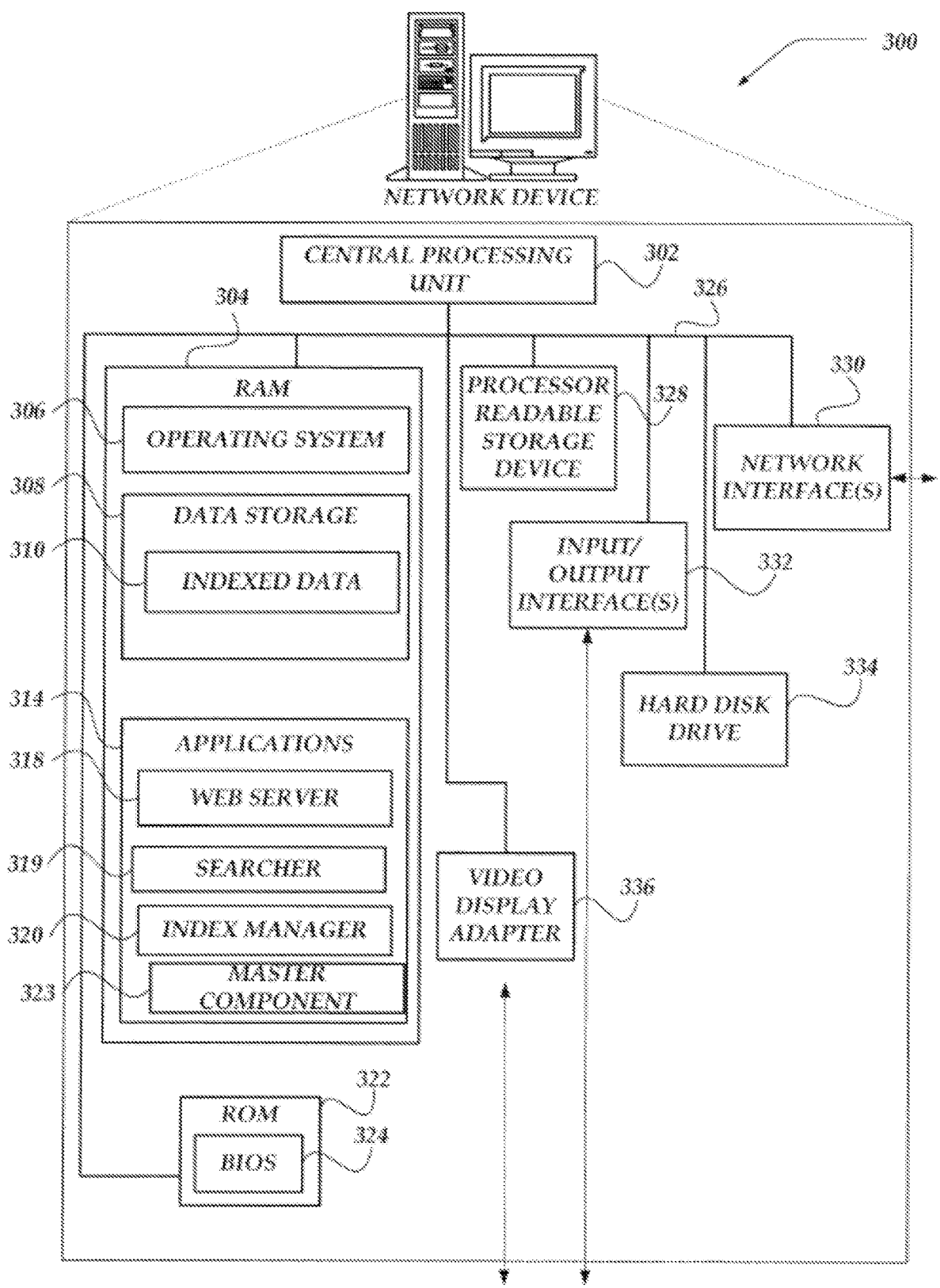
FIG. 3 illustrates one possible embodiment of a network device usable by a content provider within the environment of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the innovations. Network device 300 may be configured to operate as a server, a client, a peer, a host, or any other device. Network device 300 may represent, for example member indexers 121-123 of FIG. 1.

Network device 300 includes central processing unit 302, computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent (non-transitory) mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to computer readable storage device 328, hard disk drive 334, or the like.

Data storage 308 may further store indexed data 310. Indexed data 310 is described below in more detail in conjunction with FIG. 4. Briefly, however, indexed data 310 may be arranged in a variety of buckets usable to store and/or otherwise manage data from a forwarder device, and/or other data and meta-data, including journals, about the data.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM messsage servers, email servers, account managers, and so forth. Web server 318, searcher 319, index manager 320, and master component 323 may also be included.

Briefly, master component 323 may be configured to enable network device 300 to operate as a master device performing actions as described herein. In one embodiment, master component 323 may also be configured to manage status communications with other indexers, election of a replacement master device, should a current master device for the cluster fail, or the like.

Index manager 320 may perform a variety of actions as disclosed herein to enable network device 300 to operate as an indexer within the cluster. Thus, index manager 320 may manage collection of data, generation of journals about the data, storage of the data, generations of buckets for storage of the data, closing and opening of buckets based on a variety of criteria, and provide acknowledgements in response to receiving data for storage. Index manager 320 may also receive information indicating that network device 300 is a primary indexer, secondary indexer, or the like, for particular one or more buckets of data, receive and manage data based on a GEN-ID, or the like.

Index manager 320 may also perform actions to send the data to another indexer to be replicated, operate to reconfigure network device 300 from a secondary indexer to a primary indexer or the reverse, and/or otherwise manage the data based on a GEN_ID.

Searcher 319 may be arranged to respond to queries about the data stored and/or otherwise managed by network device 300. Searcher 319 may receive a request for data, determine whether network device 300 is a primary indexer for the data based on the data requested and GEN_ID, and in response, provide the data. Searcher 319 may determine that network device 300 is secondary for the requested data and GEN_ID and select to ignore the request for the data.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. In one embodiment, web server 318 may provide an interface usable by a client device to searcher 319, index manager 323, indexed data 310, or the like.

There is tremendous growth in the amount of data generated in the world. With decreasing storage costs and seemingly infinite capacity due to cloud services, there are fewer reasons to discard old data, and many reasons to retain it. As a result, challenges have shifted towards extracting useful information from massive quantities of data.

Mining a massive dataset is non-trivial but an even more challenging task is to mine multiple datasets from various sources and to cross-correlate the data. For example, a typical datacenter may monitor data from thousands of components; log and data output formats and collection granularities vary by component type and generation. However, an underlying assumption that can be made is that each component has a notion of time, either via timestamps or event sequences, that is captured in the logs or other data output. As the quantity and diversity of data grows, there is an increasing need for efficiently performing full text searches to mine the data.

Another challenge is that a large fraction of the world's data is unstructured, making it difficult to index and query using traditional databases. Even if a dataset is structured, the specifics of the structure may evolve with time, for example, as a consequence of system upgrades or more/less restrictive data collection/retention policies.

SPLUNK® ENTERPRISE is software produced and sold for on-premise and cloud use by Splunk Inc. of San Francisco, Calif. SPLUNK® ENTERPRISE is a comprehensive system that generates, stores, retrieves, and searches event data. SPLUNK® ENTERPRISE has gained particular appeal in the market for deriving events from unstructured data and machine data. It is the leading software for providing real-time operational intelligence, enabling organizations to collect, index, and harness machine-generated data coming from the applications, servers, networks, mobile devices, etc., that power their businesses.

At a high level, SPLUNK® ENTERPRISE can take raw data, unstructured data, or machine data such as data in Web logs, syslogs, sensor readings, etc., divide the data up into portions, and optionally transform at least part of the data in these portions to produce time-stamped events. The software derives a time stamp for each event by extracting it from the event data itself or by interpolating an event's time stamp relative to other events for which the software can derive a time stamp. SPLUNK® ENTERPRISE then stores the events in a time-series data store against which it can run queries to retrieve events that meet specified criteria, such as having certain keywords and/or having certain value(s) for certain defined field(s).

SPLUNK® ENTERPRISE is particularly noteworthy for employing a so-called "late-binding schema." As noted, an event in SPLUNK® ENTERPRISE typically contains a portion of raw data (or a transformed version of such). To run queries against events other than those involving keyword searches, a schema can be developed. Such a schema can include extraction rules for one or more fields. Each field can be defined for a subset of the events in the data store and an extraction rule can specify how to extract a value from each of the subset of events for which the field has been defined. The extraction rule for a field is often defined using a regular expression ("regex" rule), and it associates event data with a logical type of information that is contained within an event for which it is defined. The term "late-binding schema" refers to a system, such as in SPLUNK® ENTERPRISE, which does not define the schema at index time as with database technology; rather, in a system involving late-binding schema, the schema can be developed on an ongoing basis up until the time it needs to be applied (which is query time, as a query often specifies the criteria for events of interest in terms of events having specified value(s) for specified field(s)). As a data analyst learns more about the data in stored events, using a late-binding schema, he can continue to develop the schema up until the next time it is needed for a query.

Because SPLUNK® ENTERPRISE maintains the underlying searchable raw data and enables application of a late-binding schema, it has great power to enable dynamic investigation of issues that arise as a data analyst learns more about the data stored in the system's events.

As discussed herein, "time-series data" and "time-series machine data" may include, among other things, a series or sequence of data points generated by one or more data sources, computing devices, or sensors. Each data point may be a value, a small segment of data, or a large segment of data, and each data point may be associated with a timestamp or be associated with a particular point in time that provides the basis for a timestamp for the data point. The series of data points, or values/statistics derived from the data points, may be plotted over a time range or time axis representing at least a portion of the time range. The data can be structured, unstructured, or semi-structured and can come from files, directories, network packets, network events, and/or sensors. Unstructured data may refer, for example, to data whose structure is not fully understood or appreciated at the time the data is obtained by a data storage system, or it may refer to data that was generated without a particular schema in mind to facilitate the extraction of values for fields in the data during a search on the data. Machine data generated by, for example, data sources within an enterprise network environment is generally considered to be unstructured data. The visualization of such time-series data may be used to display statistical trends over time. The time-series machine data collected from a data source may be segmented or otherwise transformed into discrete events, where each event can be associated with a timestamp.

An "event" may include a single record of activity from a particular data source associated with a single timestamp. Such an event may correspond to, for example, one or more lines in a log file or other data input. Further, "events" may be derived from processing or indexing machine data, as described herein, or may include other kinds of events or notable events described herein. Events can also correspond to any time-series data, such as performance measurements of an IT component (e.g., a computer cluster, node, host, virtual machine, etc.), a sensor measurement, etc.

In an example, a field extractor within an enterprise network environment may be configured to automatically identify (e.g., using regular expression-based rules, delimiter-based rules, etc.) certain fields in the events while the events are being created, indexed, and/or stored. Alternatively, one or more fields can be identified within the events and added to the field extraction rules (used by the field extractor to identify fields within the events) by a user using a variety of techniques. Additionally, fields that correspond to metadata about the events, such as a timestamp, host, source, and source type for an event, may also be created; such fields may, in some cases, be referred to as "default fields" if they are determined automatically for all events at the time such events are created, indexed, and/or stored.

In some implementations, a given tag or alias may be assigned to a set of two or more fields to identify multiple fields that correspond to equivalent pieces of information, even though those fields may have different names or be defined for different sets of events. A set of tags or aliases used to identify equivalent fields in this way may be referred to as a common information model.

Data generated by various data sources may be collected and segmented into discrete events, each event corresponding to data from a particular point in time. Examples of such data sources include, but are not limited to, web servers, application servers, databases, firewalls, routers, operating systems, software applications executable at one or more computing devices within the enterprise data system, mobile devices, sensors, etc. The types of data generated by such data sources may be in various forms including, for example and without limitation, server log files, activity log files, configuration files, messages, network packet data, performance measurements or metrics, sensor measurements, etc.

Figure 8:
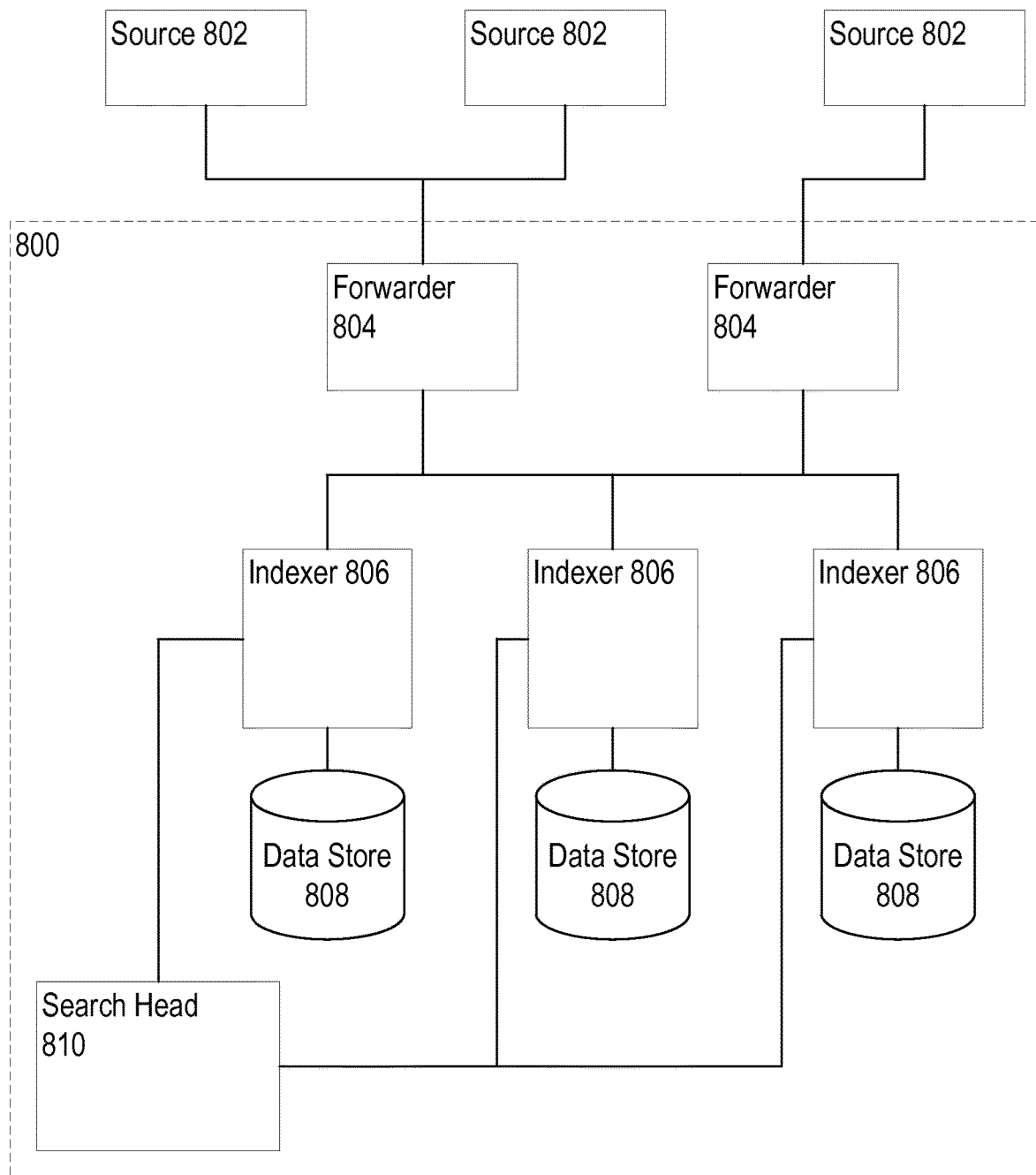
FIG. 8 illustrates an example block diagram of a data intake and query system, according to an embodiment of the invention.

FIG. 8 shows a block diagram of SPLUNK® ENTERPRISE's data intake and query system, which provides an example embodiment of a data intake and query system 800. Generally, the system 800 includes one or more forwarders 804 that collect data from a variety of different data sources 802. The forwarders 804 determine which indexer or indexers are to receive the data and forward the data to one or more indexers 806. The data typically includes streams of time-series data. Time-series data refers to any data that can be segmented such that each segment can be associated with a time stamp. The data can be structured, unstructured, or semi-structured and can come from files and directories. Unstructured data is data that is not organized to facilitate the extraction of values for fields from the data, as is often the case with machine data and web logs, two popular data sources for SPLUNK® ENTERPRISE. Alternatively, heavy forwarders can strip out extraneous data and detect time stamps for the data. Based on the time stamps, the heavy forwarders can index and group the data into buckets that fall within a common time span. The heavy forwarders then determine which indexer or indexers are to receive each bucket of data and forward the data to one or more indexers 806.

Figure 9:
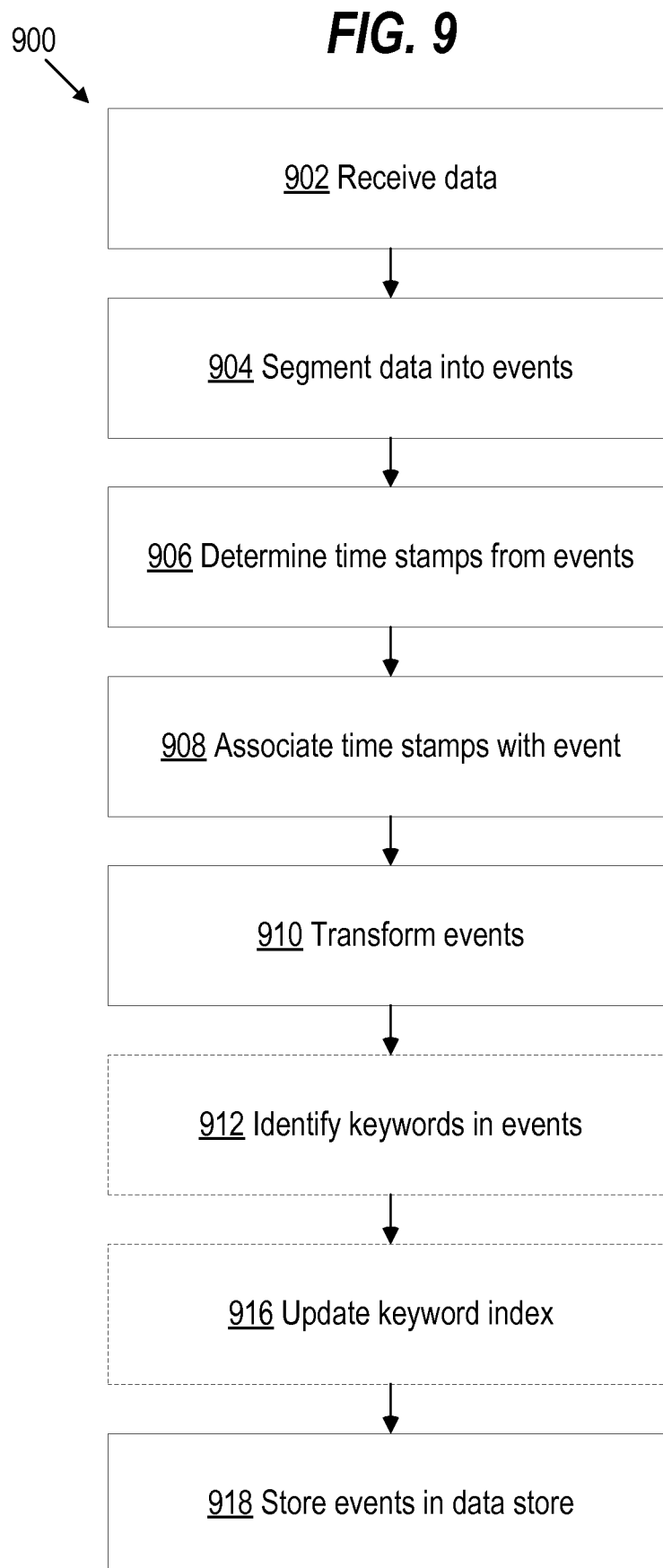
FIG. 9 illustrates a flowchart of a process that indexers may use to process, index, and store data received from forwarders, according to an embodiment of the invention.

FIG. 9 is a flowchart 900 of a process that indexers 806 may use to process, index, and store data received from the forwarders 104. At block 902, an indexer 806 receives data from a forwarder 804. At block 904, the indexer segments the data into events. The data typically consists of many lines of text that are separated by a carriage return or line break. An event may consist of one or more of these lines. The task of the indexer 806 is to determine where an event begins and ends in the lines of data. The indexer 806 can use heuristics that allow it to automatically determine how many lines constitute an event. The indexer 806 may be informed of the source of the data and have a set of heuristic rules for the source. The indexer 806 may also be able to examine a sampling of the data and automatically determine the source of the data and have a set of heuristic rules for that source. These heuristics allow the indexer 806 to use regular expression-based rules, delimiter-based rules, etc., to examine the text in each line in order to combine lines of data to form an event. The indexer 806 can examine the text for event boundaries within the text that include, but are not limited to: predefined characters, character strings, etc. These may include certain punctuation marks or special characters including, for example, carriage returns, tabs, spaces, line breaks, etc. In some instances, a user can fine tune or configure the rules that the indexers 806 use to examine the text in order to adapt to the user's equipment.

The indexer 806 determines a time stamp for each event at block 906. The time stamp can be determined by extracting the time from data in the event or by interpolating the time based on time stamps from other events. In some cases, a time stamp can be determined from the time the data was received or generated. The indexer 806 associates the time stamp with each event at block 908. For example, the time stamp may be stored as metadata for the event.

At block 910, the data included in a given event can be transformed. Such a transformation can include such actions as removing part of an event (e.g., a portion used to define event boundaries, extraneous text, characters, etc.) or removing redundant portions of an event. A user can specify a portion to remove using a regular expression or any similar method.

Optionally, a key word index can be built to facilitate fast keyword searching of events. To build such an index, in block 912, the indexer 806 identifies a set of keywords contained in the events. At block 914, the indexer 806 includes each identified keyword in an index, which associates with each stored keyword pointers to each event containing that keyword (or locations within events where that keyword is found). When an indexer 806 receives a keyword-based query, the indexer 806 can then consult this index to quickly find those events containing the keyword without having to examine again each individual event, thereby greatly accelerating keyword searches.

Optionally, an indexer 806 may facilitate fast searching of event data by creating a high performance analytics store. An indexer 106 may create a high performance analytics store by identifying, for each field of one or more selected fields contained in the events, a set of unique values contained in the field. Based on the identified unique values, a summarization table may be created with one or more entries each identifying a field name and a field value that have been extracted from event records. By examining the entries in the summarization table, an indexer 806 may rapidly find events having a particular value for a particular field and/or rapidly determine how many events are associated with a particular value for a particular field.

Techniques for increasing search performance using high performance analytics stores are described in U.S. Pat. No. 8,682,925, issued on Mar. 25, 2014, which is hereby incorporated by reference in its entirety for all purposes.

The indexer 806 stores events in a data store 808 at block 916. The data in a data store 808 can be stored in working, short-term and/or long-term memory in a manner retrievable by query. The time stamp can be stored along with each event to help optimize searching the events by time range.

In some instances, the data stored in a data store 808 includes one or more individual storage "buckets." Each bucket may correspond to a time range. An event can then be stored in a bucket associated with a time range inclusive of the event's time stamp. This not only optimizes time based searches, but it can allow events with recent time stamps that may have a higher likelihood of being accessed to be stored at preferable memory locations that lend to quicker subsequent retrieval (such as flash memory instead of hard disk media).

Data stores 808 may be distributed across multiple indexers 806, each responsible for storing and searching a subset of the events generated by the system. The subset of events for which a particular indexer is responsible for may correspond to a set of time-based buckets that are stored by the particular indexer. By distributing the time-based buckets among the indexers 106, the indexers can find events responsive to a query in parallel using map-reduce techniques, each returning their partial responses for specific buckets to the query to a search head 110 that combines the results together to answer the query.

Figure 10:
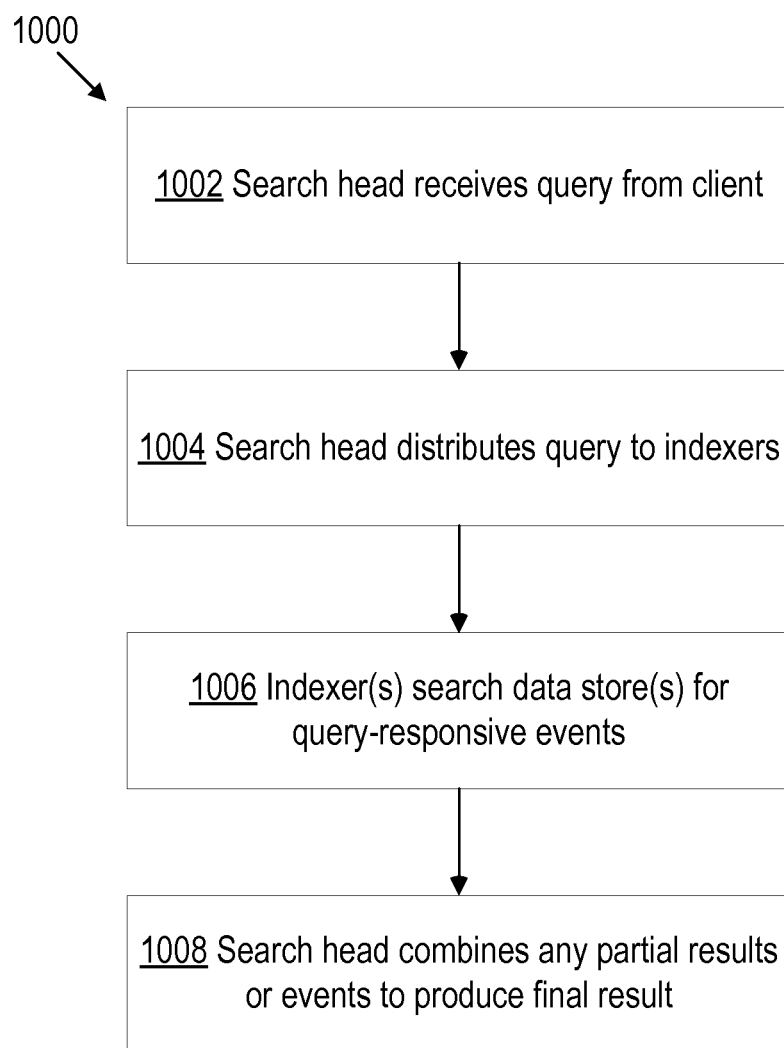
FIG. 10 illustrates a flowchart of a process that a search head and indexers perform during a typical search query, according to an embodiment of the invention.

FIG. 10 is a flowchart 1000 of a process that a search head 810 and indexers 806 may perform during a typical search query. At block 1002, a search head 810 receives a query from a client.

At block 1004, the search head 810 is responsible for analyzing the search query to determine what part can be delegated for execution by indexers 806 and what part needs to be executed by the search head 810. Streaming commands can be trivially delegated to the indexers 806. Conversely, aggregating commands are more complex to distribute.

The search head 810 can perform optimization steps in order to make the search more efficient. As mentioned above, the indexers 806 may create an index of keywords. In one optimization, before the search starts executing, the search head 810 determines the time range required for the search and a set of common keywords that all matching events must have. The retrieval phase uses these parameters to query the indexers 806 for a superset of the eventual results. The indexers 806 return the superset of results that the search head can perform a filtering stage on. The filtering stage performs field extraction on the superset to arrive at a reduced set of search results.

Figure 11:
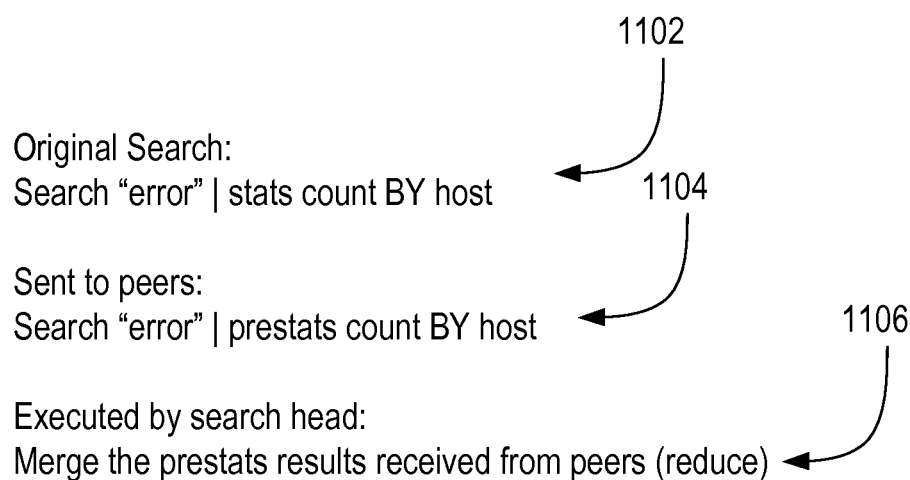
FIG. 11 illustrates an example of a search query received from a client that the search head can split into two parts, according to an embodiment of the invention.

In another optimization, to achieve better computation distribution and minimize the amount of data transferred between indexers 806 and the search head 810, many aggregating commands implement a map operation which the search head can delegate to the indexers 806 while executing the reduce operation locally. FIG. 11 shows an example of a search query 1102 received from a client that the search head can split into two parts: one part to be executed by indexers 806 and one part to be executed by the search head 810. Here, the search query 1102 makes the indexers responsible for counting the results by host and then sending their results to the search head 810. The search head 810 then performs the merging 1106. This achieves both computation distribution and minimal data transfer.

The search head 810 may distribute the search query to one or more distributed indexers 806. The search query may contain one or more regular expressions that each of the indexers 806 is to apply to any event data that is determined to fall within the parameters of the regular expression. These indexers can include those with access to data stores having events responsive to the query. For example, the indexers can include those with access to events with time stamps within part or all of a time period identified in the query.

At block 1006, one or more indexers 806 to which the query was distributed searches its data store 808 for events responsive to the query. To determine events responsive to the query, a searching indexer 806 finds events specified by the criteria in the query. This criteria can include that the events have particular keywords or contain a specified value or values for a specified field or fields (because this employs a late-binding schema, extraction of values from events to determine those that meet the specified criteria occurs at the time this query is processed). The indexer 806 may conduct a search for responsive events by processing the content of the events using the one or more regular expressions to extract information associated with fields specified in the one or more regular expressions, by using a key word index to search for keywords specified in the query, and/or by using a high performance value store or other search techniques.

The indexers 806 can either stream the relevant events back to the search head 810 or use the events to calculate a partial result responsive to the query and send the partial result back to the search head 810. At block 1008, the search head 810 combines or reduces all of the partial results or events received from the parallel processing indexers together to determine a final result responsive to the query.

Data intake and query system 800 and the processes described with respect to FIGS. 8-11 are further discussed and elaborated upon in Carasso, David. Exploring Splunk Search Processing Language (SPL) Primer and Cookbook. New York: CITO Research, 2012 and in Ledion Bitincka, Archana Ganapathi, Stephen Sorkin, and Steve Zhang. Optimizing data analysis with a semi-structured time series database. In SLAML, 8070. Each of these references is hereby incorporated by reference in its entirety for all purposes.

SPLUNK® ENTERPRISE can accelerate some queries used to periodically generate reports that, upon each subsequent execution, are intended to include updated data. To accelerate such reports, a summarization engine periodically generates a summary of data responsive to the query defining the report for a defined, non-overlapping subset of the time period covered by the report. For example, where the query is meant to identify events meeting specified criteria, a summary for a given time period may include only those events meeting the criteria. Likewise, if the query is for a statistic calculated from events, such as the number of events meeting certain criteria, then a summary for a given time period may be the number of events in that period meeting the criteria.

Because the report, whenever it is run, includes older time periods, a summary for an older time period can save the work of having to re-run the query on a time period for which a summary was generated, so only the newer data needs to be accounted for. Summaries of historical time periods may also be accumulated to save the work of re-running the query on each historical time period whenever the report is updated.

A process for generating such a summary or report can begin by periodically repeating a query used to define a report. The repeated query performance may focus on recent events. The summarization engine determines automatically from the query whether generation of updated reports can be accelerated by creating intermediate summaries for past time periods. If it can, then a summarization engine can periodically create a non-overlapping intermediate summary covering new data obtained during a recent, non-overlapping time period and stores the summary in a summary data store.

In parallel to the creation of the summaries, the query engine schedules the periodic updating of the report defined by the query. At each scheduled report update, the query engine determines whether intermediate summaries have been generated covering parts of the time period covered by the current report update. If such summaries exist, then the report is based on the information from the summaries; optionally, if additional data has been received that has not yet been summarized but that is required to generate a complete report, then the query is run on this data and, together with the data from the intermediate summaries, the updated current report is generated. This process repeats each time an updated report is scheduled for creation.

Search and report acceleration methods are described in U.S. Pat. No. 8,589,403, issued on Nov. 19, 2013, and U.S. Pat. No. 8,412,696, issued on Apr. 2, 2011, both of which are hereby incorporated by reference in their entirety for all purposes.

3.0 General Operation

The operation of certain aspects of various embodiments will now be described with respect to FIGS. 4-7. FIG. 4 illustrates one non-limiting, non-exhaustive example of managing redundant data backup and recovery across a plurality of member indexers within a cluster.

Figure 4:
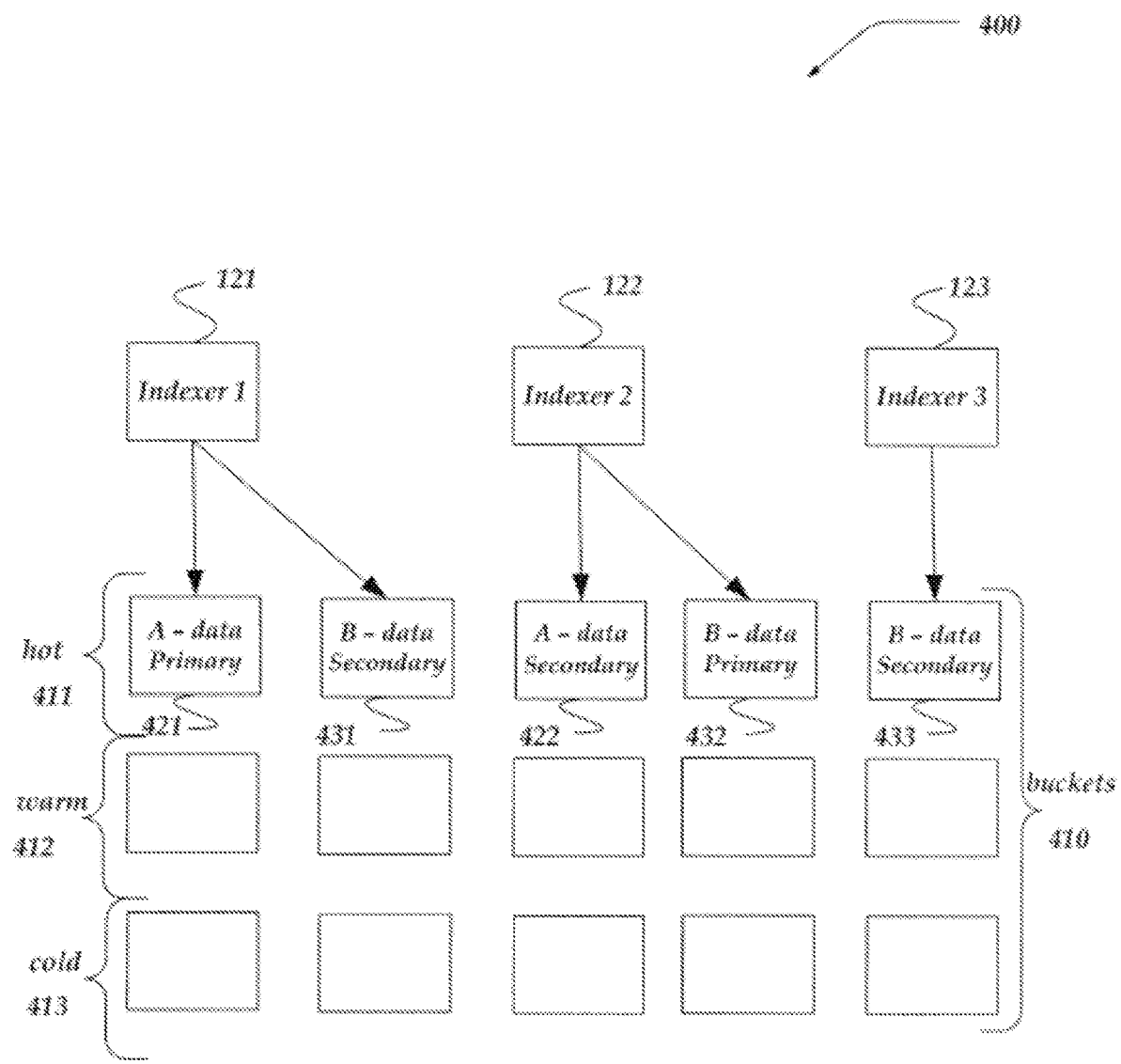
FIG. 4 illustrates one non-limiting, non-exhaustive example of managing redundant data backup and recovery across a plurality of member indexers within a cluster.

As shown, architecture 400 of FIG. 4 illustrated a plurality of buckets 410 managed by indexers 121-123. Briefly, a bucket represents a mechanism usable for storing and/or otherwise managed data and events received from a forwarder device. As shown, buckets 410 may be designated as hot 411, warm 412, cold 413 buckets, to indicate whether a bucket is open to receive and store data (hot), recently closed for receiving data but available for access of data (warm), or closed and may be unavailable readily for access of data (cold). In one embodiment, based on any of a variety of criteria, buckets may have an expiration policy, indicating when a bucket is to be closed, moved from hot to warm to cold, to even removed from the system of buckets 410.

Architecture 400 illustrates that an indexer may have a plurality of buckets in which to manage data. Moreover, as shown, one indexer may be a primary indexer for some data, and a secondary indexer for other data. See for example, indexer 121 is primary for A-data 421, and secondary for B-data 431, while indexer 122 is primary for B-data 432 and secondary for A-data 422. Also shown, is that based on the replication factor, there may be more than one secondary indexer, such as indexer 123 (for B-data 433).

Figure 5:
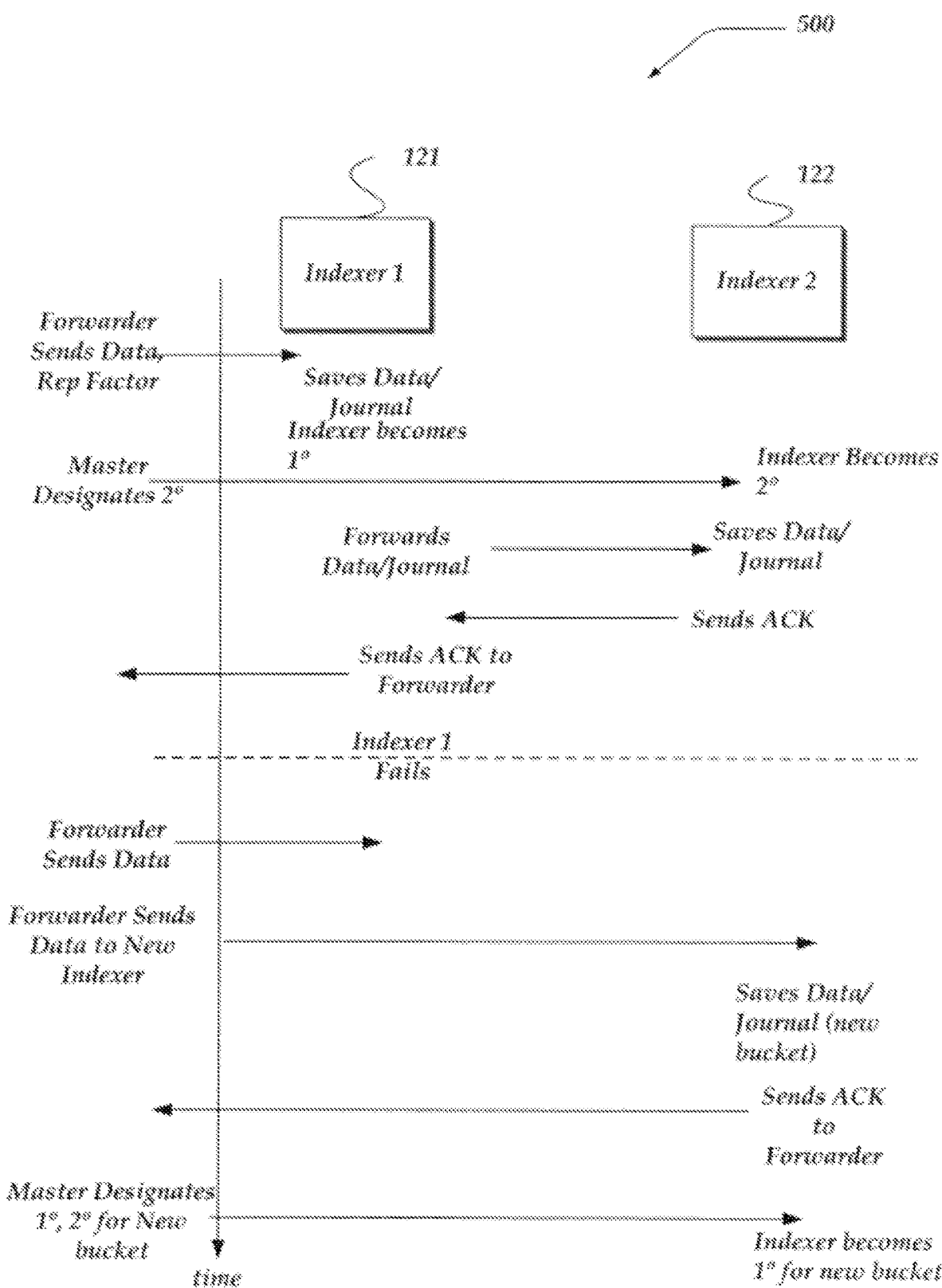
FIG. 5 illustrates one embodiment of a signal flow usable to manage redundant (replication) of data across multiple member indexers within a cluster.

FIG. 5 illustrates one embodiment of a signal flow usable to manage redundant (replication) of data across multiple member indexers within a cluster. As shown in flow 500, indexer 121 and indexer 122 communicate with each other, a master device, and/or forwarder device. Time is indicated as flowing downwards. Further, 1° and 2° indicate primary and secondary, respectively. It should also be noted that while more or less communications may occur between at least these devices, those shown are sufficient to disclose an illustrative embodiment for practicing the innovations.

As shown, forwarder device, based on any of variety of criteria selects indexer 121 and send data and a replication factor value to indexer 121 to store the data, and to further forward the data to other indexers for replication. In one embodiment, receiving of the data from a forwarder device may initiate opening or otherwise creation of a hot bucket for storage of the data. In one embodiment, indexer 121 may receive information from the master device indicating a GEN_ID for the bucket.

Indexer 121, assuming it is functional and active (has not failed), then prepares and saves the data to the hot bucket. As noted above, in one embodiment, the received data may be referred to as a "slice." That is, in one embodiment, the slice may represent a small amount of data, typically of a few kilobytes in size—although other sizes may also be received. Further, indexer 121 may generate a journal or perform other actions on the data as discussed above. The journal and results of the actions may also be saved within the bucket.

Indexer 121 may, in one embodiment, receive information from the master device indicating other indexers, such as indexer 122, that is assigned or otherwise available to be a secondary indexer for the data. In another embodiment, indexer 121 may employ the replication factor and send the data to the indicated number of other indexers, thereby indicating that they are to become secondary indexers for the data. The master device may then update information about which devices are primary or secondary for the data.

In one embodiment, indexer 122 receives the data/journal from indexer 121 and saves the data, operating as a secondary indexer. Assuming that indexer 122 has not failed, operating as a secondary indexer, indexer 122 provides an acknowledgment to indexer 121 that it has received and stored the data/journal. Should indexer 122 not provide an acknowledgement within a defined amount of time, indexer 121 may elect to resend the data/journal and/or select a different indexer as a secondary indexer for the data. In one embodiment, because GEN_ID is global, each indexer may further store the data in a bucket having the GEN_ID as an identifier.

Independent of whether or not indexer 121 receives an acknowledgment from indexer 122, when indexer 121 has received and stored the data, indexer 121 provides an acknowledgement to the forwarder device.

Shown is an example of what happens when indexer 121 fails. As shown, forwarder device may send data to indexer 121 for a new hot bucket. However, because the forwarder device does not receive an acknowledgement, the forwarder may seek to send the data to another indexer based on any of a variety of selection criteria. In this instance, again assuming that indexer 122 is active; it receives the data, generates a journal, creates a hot bucket for the data, and returns an acknowledgement to the forwarder device. Indexer 122 then becomes the primary indexer for this data.

Figure 6:
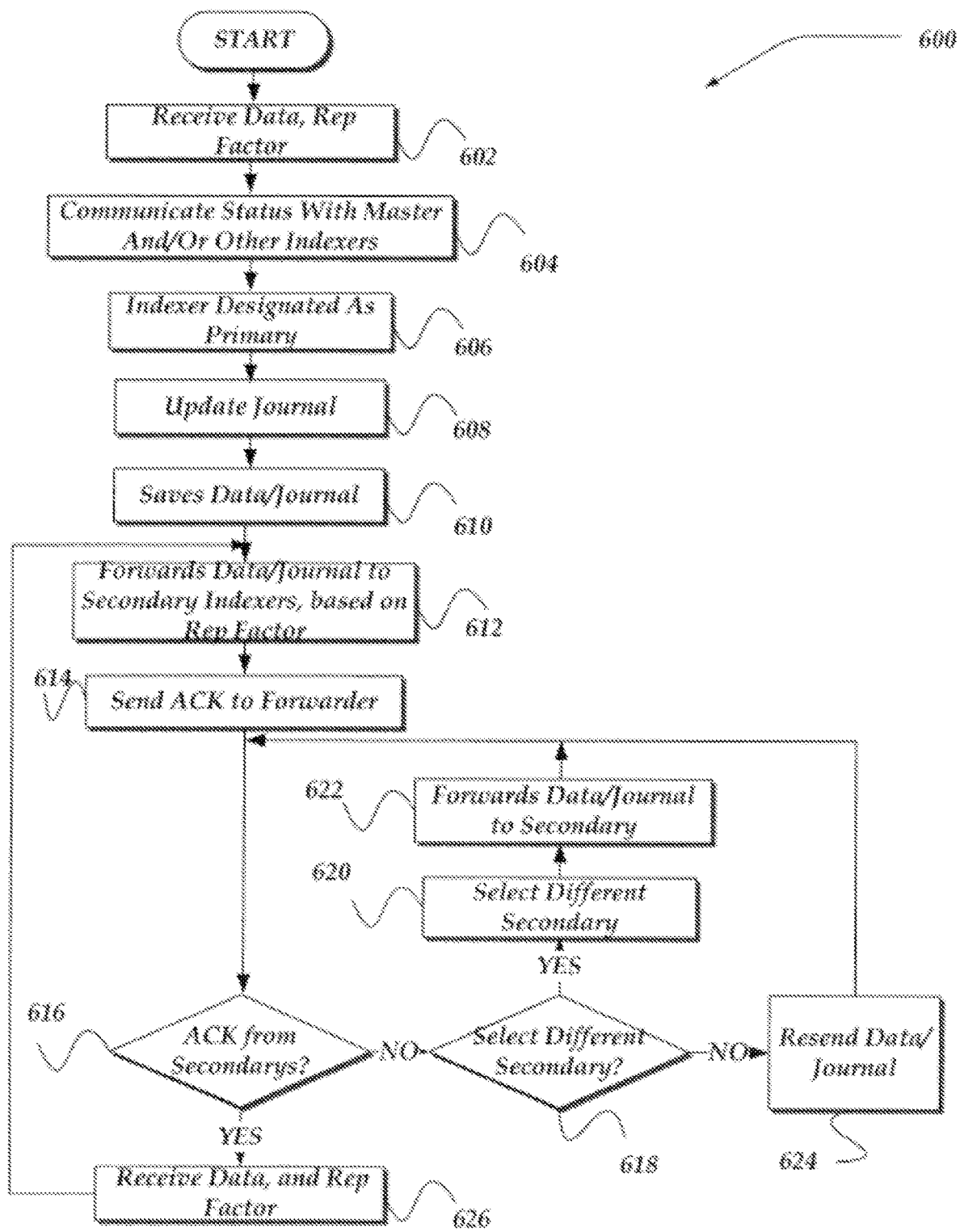
FIG. 6 illustrates a flow chart of one embodiment of a process usable to manage redundant (replication) of data across multiple member indexers within a cluster.

FIG. 6 illustrates a flow chart of one embodiment of a process usable to manage redundant (replication) of data across multiple member indexers within a cluster. Process 600 of FIG. 6 may be performed by an indexer within a cluster as discussed above in conjunction with FIG. 1.

Process 600 begins, after a start, wherein data is received. In one embodiment, a replication factor might also be received. Processing flows to block 604 where, in one embodiment, communications of status may be performed between the master device, and/or other indexers. In one embodiment, the communications may indicate an availability of the other indexers to operate as a secondary indexer, a GEN_ID, or the like.

Process 600 continues to block 606 where in one embodiment, the indexer receiving the data from the forwarder device is designated as the primary indexer for that data and GEN_ID. Continuing next to block 608, the journal is created and/or updated as discussed above. Flowing to block 610, the data and journal are stored into a hot bucket having the GEN_ID. At block 612, the data/journal are forwarded to one or more other indexers to operate as secondary indexers for the data having the GEN_ID. At block 614, an acknowledgement that the data has been received and/or stored by the primary indexer is sent to the forwarder device.

Flowing next to decision block 616 a determination is made whether an acknowledgement is received from each of the designated secondary indexers. If not, then processing flows to decision block 618; otherwise, processing flows to block 626.

At decision block 618, a determination is made whether to select a different secondary indexer. This may be based, in part, on a licensing or service level agreement with the forwarder device, the replication factor, or the like. In any event, if another secondary indexer is to be selected, processing flows to block 620 where a different indexer is select, and at block 622, the data/journal is sent to the selected indexer. Processing then loops back to decision block 616. At block 624, the data/journal may be resent to the secondary indexer. Processing loops back to decision block 616.

At block 626, the primary indexer may receive another slice of data to be stored in the hot bucket for the identified GEN_ID. Processing then continues back to block 612.

Figure 7:
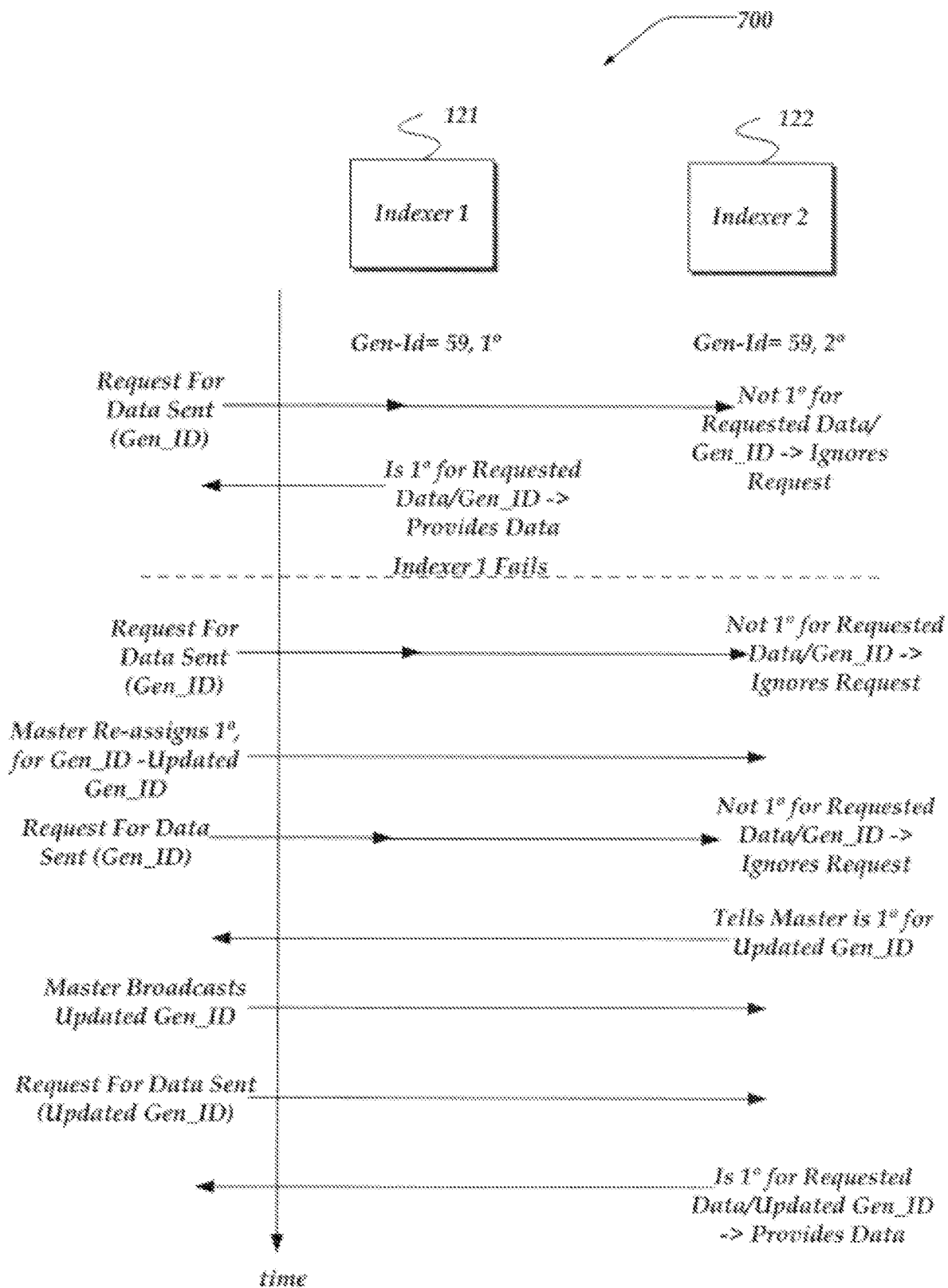
FIG. 7 illustrates non-limiting, non-exhaustive examples of managing a request for data during a member indexer failure within a cluster.

While data storage is one aspect of the innovations, another is managing of requests for the stored data. Thus, FIG. 7 illustrates non-limiting, non-exhaustive examples of managing a request for data during a member indexer failure within a cluster. Time is illustrated as flowing downwards.

As shown, flow 700 of FIG. 7 represents signal flows between a searcher device, master device, and indexers, such as discussed above in conjunction with FIG. 1. It should also be noted that while more or less communications may occur between at least these devices, those shown are sufficient to disclose an illustrative embodiment for practicing the innovations.

As shown, indexer 121 is primary indexer for the data under discussion at GEN_ID=59, while indexer 122 is secondary indexer for the data.

A request for the data is received from a searcher device. In one embodiment, the searcher device provides the GEN_ID for the data requested. As illustrated the request may be broadcast to each of the indexers within the cluster. However, because indexer 122 is not the primary indexer, it ignores the request, and indexer 121 which is primary for the data instead provides a response to the data request. In this manner, the same data is not provided more than once to the same request.

Now, consider that indexer 121 fails. When another request is received, in one embodiment, because there is no primary indexer, a response might not be provided. However, in one embodiment, the request for the data might be delayed at least until indexer 122 is provided sufficient time to reconfigure and become the new primary indexer for the data. In one embodiment, the master device might initiate this action. However, in another embodiment, the secondary indexers might also recognize that the primary indexer has failed, and elect among themselves a new primary indexer for the data. In one embodiment, the GEN_ID may also be incremented as illustrated in flow 700.

However, in still another embodiment, the searcher device may elect to wait until a new primary indexer is available, or elect to proceed with a partial data response.

In any event, as shown above, while the master device may be aware of which indexer is primary or secondary, and where data may be stored, as well as managing GEN_IDs, the cluster may still operate should the master device fail. That is because the data is still managed by the indexers, and thus, the indexers are not dependent upon the master device for the data. As noted, election of the primary indexer (and potentially even the secondary indexers) may be achieved without the master device's intervention. Further, it is even possible that failure of a primary indexer may be resolved while the master device is failed. Additionally, searches and other data queries may use earlier GEN_ID values.

However, as noted because GEN_ID increments, there may be value in being aware of a history of the GEN_ID, and which indexer was/is primary for that GEN_ID value. Thus, in one embodiment, an indexer might be primary for one value of GEN_ID for some data, and be secondary or otherwise unrelated to the data at a different GEN_ID. Thus, in one embodiment, search requests may provide multiple GEN_IDs, and receive responses from different primary indexers based on the different GEN_IDs.

For example, a first search request might request searches be performed by an indexer, using a first GEN_ID value, while a second search request might be requested to be performed by an indexer using a second, different, GEN_ID value. Further, while the requests might be received by multiple indexers, because each indexer knows whether or not they are primary for different buckets at different GEN_ID values, each of the requests will receive responses that are complete and non-redundant sets of results even though which indexers search which buckets may change.

In one embodiment, a bit map may be employed to provide such multiple GEN_ID usages. For example, an index value may have bits of some range, such as 64 bits. Other ranges may also be used. In this example, some set of bits may indicate that searches for the data may occur on one indexer, while setting of other bits indicate that the other portion of searches are to be performed on another, different indexer. This feature may further be useable to indicate, for example, that for some of the data, one indexer is primary, and for other portions of the data, a different indexer is primary. This may be useful for implementing, for example, multi-geographic storage policies. For example, indexer 121 might be primary to store data for west coast, and indexer 122 might be primary to store data for east coast. Further, based on this type of bit mapping extension, different replication factors might also be used based on the geography, or the like.

In any event, it will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

4.0 Clustered Operating Environment

It should be appreciated that, to achieve high availability and to provide for disaster recovery of data stored in a system such as the data intake and query system illustrated in FIG. 8, the system may be configured to operate as a cluster. A clustered data intake and query system as described herein generally may include multiple system components (e.g., forwarders, indexers, data stores, and/or search heads) configured to operate together in a coordinated fashion. To provide for high availability and disaster recovery in a clustered system, data processed and stored by an indexer in a data store may be replicated across one or more other indexers and data stores of the cluster according to a user configurable data replication policy. In one embodiment, a specialized cluster component, referred to herein as a master node, may be configured to coordinate various aspects of replicating data across data stores of the cluster and performing searches against data that has been replicated in a cluster.

There are many options for how data may be replicated in a cluster and, in one embodiment, the manner in which data is replicated in a particular cluster may be based in part on a user configurable data replication policy. One configurable component of a data replication policy may be referred to as a "replication factor." The replication factor for a cluster is a value indicating a number of copies of each data subset, or bucket, created by an indexer that are to be stored across other indexers and in separate data stores of the cluster. For example, a cluster configured with a replication factor of two (2) indicates that for each data bucket created by an indexer, one additional copy of the bucket is to be created and stored by a different indexer of the cluster. Similarly, a cluster configured with a replication factor of four (4) indicates that each data bucket created by an indexer is to be replicated by three additional indexers of the cluster. In this manner, a cluster configured with a particular replication factor generally can tolerate a concurrent failure of a number of indexers that is one less than the replication factor.

As indicated above, when an indexer receives data from a forwarder, the indexer may store the data in one or more grouped subsets, or buckets, each corresponding to a time range associated with the data in the bucket. Each bucket created by an indexer (or heavy forwarder) may contain at least two types of files: event data extracted from the raw data and, optionally, a key word index that enables searches to be performed on the event data. In one embodiment, each replicated copy of a bucket created according to a data replication policy may either be searchable, meaning the bucket includes a copy of the key word index, or non-searchable, meaning the bucket includes only a copy of the event data and is not immediately searchable. To determine a number of searchable copies of each bucket to store the cluster, a data replication policy may further be configured with a "search factor." A search factor is similar to a replication factor except that it indicates a number of searchable copies of each bucket to store in the cluster. For example, a cluster may be configured with a search factor of one (1), indicating that only one of the copies of a bucket is to include a key word index. However, if a search factor of greater than one is configured, some or all of the indexers storing a replicated copy of a bucket also may generate index files for the buckets they are replicating, or the indexers may receive a copy of the index files from another indexer.

A cluster may be configured with a different replication factor and search factor. For example, a particular cluster may be configured with a replication factor of three (3) and a search factor of two (2). Based on this example data replication policy, the cluster maintains three copies of each bucket in the cluster; however, only two of the copies of each bucket contain index files and are therefore capable of responding to search requests. The indexers storing the third copy of each bucket that does not include the index files may not be able to respond to search requests, but the bucket can be made searchable at a later time by causing the indexer storing the bucket to generate the appropriate index files or to receive the index files from another indexer. For example, a non-searchable copy of a bucket may be made searchable due to one or more indexers storing a searchable copy of the bucket experiencing a failure.

As indicated above, a cluster configured with a data replication policy causes replicated copies to be stored of each bucket created by an indexer of the cluster. When a search query is received by a search head associated with the cluster, the search head may distribute the search query to all of the indexers of a cluster. However, if multiple indexers in the cluster store copies of one or more buckets that contain data that partially satisfies the search query, duplicate search results may be returned to the search head. To ensure that only one indexer of a cluster returns results from each bucket when multiple copies of the buckets exist in the cluster, one indexer is designated as the "primary" indexer for each bucket while other indexers storing copies of the same bucket are designated as "secondary" indexers. An indexer that is designated as the primary indexer for a bucket has primary responsibility for returning results from that bucket that are responsive to search queries received by the primary indexer, while secondary indexers do not respond to search queries with results from secondary copies of the same bucket. In other words, when a indexer of a cluster receives a search query from a search head, the indexer finds events in buckets for which the indexer is the primary indexer and that satisfy the search query criteria. In an alternative embodiment, the other indexers storing copies of the same bucket are simply not designated as the primary indexer for the bucket.

For each bucket that is replicated across multiple indexers of a cluster, the designation of one indexer as the primary indexer and other indexers as secondary indexers may change over time. In one embodiment, a mapping of cluster indexers as either the primary indexer or a secondary indexer for each bucket may be represented using the concept of a "generation." In general, a generation represents a "snapshot" of the cluster at a particular point in time and identifies which indexers are primary and which indexers are secondary for each bucket and replicated copy of a bucket stored in the cluster. A centralized "master node" of the cluster may be responsible for creating a generation mapping and distributing the generation mapping to other components of the cluster.

A master node may create multiple different generations with different mappings over time as conditions within the cluster change. Each generation may be identified by a unique generation identifier represented, for example, by a monotonically increasing counter or other set of unique values. For example, a first generation may be represented by a generation identifier of zero (generation 0), a second generation represented by a generation identifier of one (generation 1), and so forth. Thus, for a first generation 0, a particular indexer X of a cluster may be designated as the primary indexer for a particular bucket Z that is replicated across a number of indexers in the cluster. At a later time, a new generation 1 may be created and a different indexer Y instead may be designated as the primary indexer for the same bucket Z. A master node may create new generations and corresponding generation identifiers in response to a number of different cluster events including, but not limited to, any of: the master node initializing, a new indexer joining the cluster, a current indexer failing or leaving the cluster, to rebalance the buckets of a cluster, etc.

Figure 12:
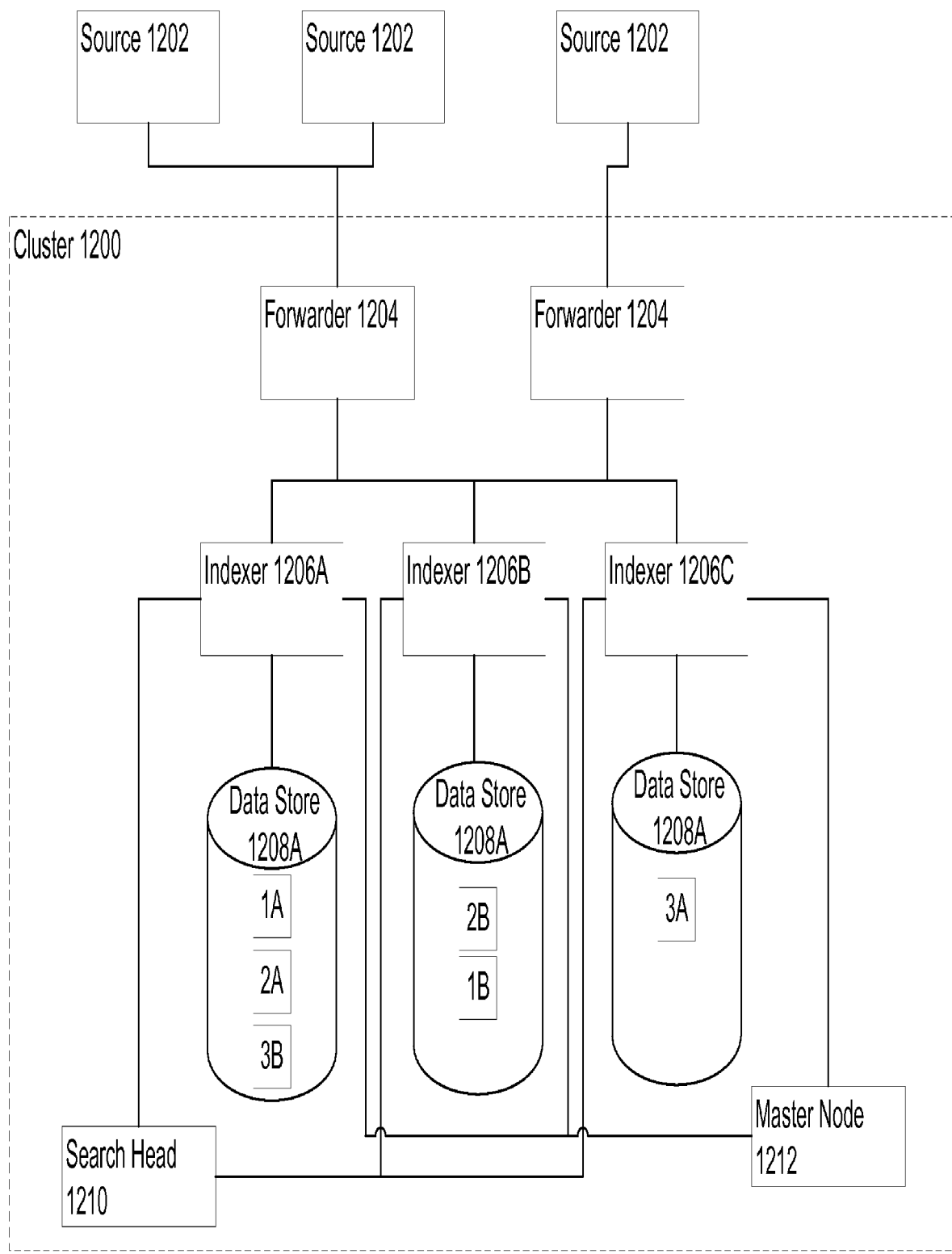
FIG. 12 illustrates an example block diagram of a clustered data intake and query system, according to an embodiment of the invention.

FIG. 12 shows a block diagram of an example embodiment of a clustered data intake and query system, according to one embodiment. Similar to the system 800 of FIG. 8, cluster 1200 includes one or more forwarders 1204 that collect data from a variety of different data sources 1202 and which determine which indexer or indexers (e.g., one or more of indexers 1206A-1206C) are to receive the data. An indexer 1206A-1206C receiving data from a forwarder 1204 may perform various operations to process, index, and store the data in a corresponding data store 1208A-1208C. The data processed by an indexer 1206A-1206C may be stored in a corresponding data store 1208A-1208C in one or more grouped subsets, or buckets, that correspond to various time ranges. For example, each of data stores 1208A-1208C is depicted in FIG. 12 as storing one or more example buckets 1A, 1B, 2A, 2B, 3A, and 3B. In this example, "A" and "B" versions of a bucket represent copies of the same bucket.

In cluster 1200, a search head 1210 is responsible for distributing search queries received from clients to indexers 1206A-1206C and consolidating any search results received from the indexers. For example, a search head 1210 may distribute a search query to indexers 1206A-1206C which perform the actual searches against the buckets stored by the indexers in data stores 1208A-1208C.

To perform a search against data stored by cluster 1200, in one embodiment, a search head 1210 may first obtain information from master node 1212 including a list of active indexers and a generation identifier. As indicated above, a generation identifier identifies a particular generation mapping which indicates, for each bucket in the cluster, which indexer is the primary indexer and which indexers are secondary indexers.

The search head 1212 may distribute the search query to all of the active indexers along with the generation identifier. Each indexer receiving the search query may use the generation identifier to identify which generation mapping to consult when searching the buckets stored by the indexer. In other words, based on the generation information corresponding to the received generation identifier, each indexer searches for event results in buckets for which the indexer is the primary indexer and which satisfy the search query criteria. After processing the search query, each indexer may send a response to search head 1210 either including event results or indicating that the indexer has zero event results satisfying the search criteria based on the generation information. The response from each indexer may further include metadata information indicating an amount of time that elapsed to process the search and/or other diagnostic information. If a search head 1210 does not receive a response from one or more of the indexers to which the search query was distributed, the search head 1210 may generate an alert indicating that a response was not received from the indexer(s) and that the search results therefore may be incomplete.

Typically, a search head 1210 performs a search query with respect to the most recent generation created by the master node. However, in some cases where one or more queries take an abnormally long time to process, it is possible that indexers of a cluster could be processing a search query based on a generation that is earlier than the current generation. Those same indexers could receive a subsequent search query that is based on the current generation and therefore concurrently process two separate queries based on different generations.

In one embodiment, a master node 1212 may be configured to maintain an approximately equal number of buckets on each indexer, and to maintain an approximately equal number of buckets for which each indexer has primary responsibility. Without an even distribution of buckets and primary indexer responsibilities, it may be possible that individual indexers have primary responsibility for more buckets than others and may become overloaded if a sufficiently large number of queries are submitted near in time to one another. A master node 1212 may periodically rebalance buckets by determining how many buckets are currently stored by each indexer and which indexers are primary indexers for each bucket, and create a new generation where the number of buckets for which each indexer has primary responsibility is approximately the same.

Figure 13:
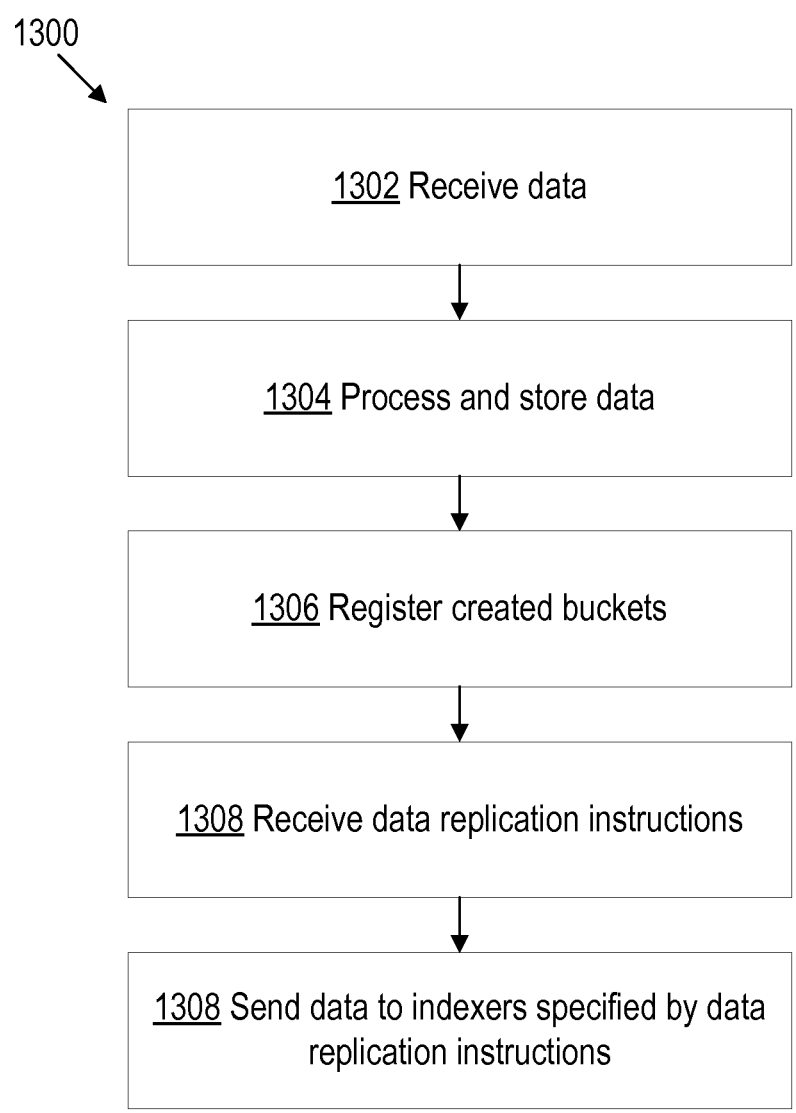
FIG. 13 illustrates a flowchart of a process that indexers may use to replicate data in a clustered data intake and query system, according to an embodiment of the invention.

FIG. 13 illustrates a flowchart of a process that indexers may use to replicate data in a clustered data intake and query system, according to an embodiment. At block 1302, an indexer (e.g., one of indexers 1206A-1206C) receives data from a forwarder 1204. At block 1304, the indexer processes and stores data in a corresponding data store 1208A-1208C. Processing the data by an indexer, for example, may include one or more of the steps of segmenting, transforming, and indexing the data, as described in steps 904-916 of FIG. 9.

As indicated above, the data may be stored by the indexer in a data store in one or more grouped subsets, or buckets, of the data received from the forwarder.

At block 1306, the indexer registers any newly created buckets with master node 1212. Master node 1212 may store information about the newly created buckets as part of the current generation information, or the master node 1212 may create a new generation that includes information for the newly created buckets. The master node 1212 generates, based on a configured data replication policy for the cluster, data replication instructions that include a list of "peer" indexers in the cluster that are to store a replicated copy of the one or more registered buckets. As indicated above, the number of peer indexers that are selected to store a replicated copy of the one or more registered buckets correspond to a replication factor configured for the cluster. The selection of particular peer indexers for storing replicated bucket copies may be further based in part on load balancing criteria or other factors determined by the master node 1212. The data replication instructions may also include, for each of the selected peer indexers, whether the peer indexer is to store a searchable or non-searchable copy of each bucket. The master node 1212 sends the data replication instructions to the indexer registering the buckets.

In block 1308, the indexer receives the data replication instructions including the list of peer indexers to store replicated copies of the buckets created by the indexer. In block 1310, the indexer forwards the data to the peer indexers, each of which stores the data in a corresponding data store and, if the peer indexer is storing a searchable copy, processes the data to generate a separate key word index. The data forwarded to the peer indexers may include the raw data received from the forwarder, the event data as processed by the indexer, or any combination thereof.

Referring again to FIG. 12, to illustrate one example of a cluster with data stored according to a data replication policy, each of data stores 1208A-1208C is depicted storing one or more of the buckets labeled 1A, 2A, 1B, 2B, 3A, and 3B. The example cluster 1200, for example, may be configured with a replication factor of two (2). As indicated above, an "A" version of a bucket represents an original version of the bucket, whereas a "B" version represents a replicated copy of the same data bucket. For example, indexer 1206A may have received data from a forwarder 1204 which indexer 1206A processed and stored in the bucket labeled 1A. After registering the bucket 1A with master node 1212 and based on received data replication instructions, indexer 1206A forwarded the data for bucket 1A to indexer 1206B which stored a copy of the data in the bucket labeled 1B. Similarly, indexer 1206C may have received data from a forwarder 1204 and stored the data in the bucket labeled 3A. Based on replication instructions received from master node 1212, indexer 1206C forwarded the data for bucket 3A to indexer 1206A which stored a copy of the data in the bucket labeled 3B.

Because the example data replication policy for cluster 1200 is configured with a replication factor of two (2), as illustrated above, two copies of each bucket are stored by separate components of the cluster. In this manner, if any one of indexers 1206A-1206B were to experience a failure, at least one copy of each bucket in the cluster still exists somewhere in the cluster. In response to such a failure, master node 1212 may create a new generation that, if necessary, reorganizes the designation of particular indexers in cluster 1200 as the primary indexer for each bucket so that a searchable copy of each bucket is available without disruption. Techniques for managing data in a cluster environment are described in U.S. patent application Ser. No. 13/648,116, filed on Oct. 9, 2012, U.S. patent application Ser. No. 13/662,358, filed on Oct. 26, 2012, and U.S. Provisional Patent Application No. 61/647,245, filed on May 15, 2012, each of which is hereby incorporated by reference in their entirety for all purposes.

5.0 Multi-Site Clusters

As indicated above, a cluster may be configured to replicate data in the cluster across multiple indexers of the cluster to improve the availability of the data and to provide for disaster recovery of data in the cluster. However, if all of the indexers of a cluster are geographically co-located at the same site (e.g., within a single data center or office building), the benefits of data replication may be negated upon the occurrence of a failure that affects the entire site. For example, a site-wide failure caused by a major power outage, natural disaster, or a man-made disaster may be capable of entirely disrupting the operation of a cluster if all of the cluster components are located at the same site.

In one embodiment, to further improve the fault tolerance and disaster recovery abilities of a clustered data intake and query system, a cluster may be configured to ensure that replication of data occurs across indexers located at multiple geographically dispersed sites. A cluster that includes the concept of "sites" as part of its data replication policy is referred to herein as a multi-site cluster. A site may refer to a logical grouping of one or more cluster components that may each be associated with a particular geographic location. For example, if a business has two data centers on the east coast and west coast, respectively, a user may define a separate site for each of the data centers and associate particular cluster components with each site depending on where each of the cluster components is located physically.

In one embodiment, in addition to a user configurable replication factor, a data replication policy for a multi-site cluster may further include configuration of a site replication factor. Whereas a replication factor indicates a number of times that each bucket created in a cluster is to be replicated within the cluster, a site replication factor indicates, for each bucket, a number of different sites at which to store a copy of the bucket. For example, a cluster may be configured with five (5) separate sites, a replication factor of four (4), and a site replication factor of three (3). In this example, for each bucket created by an indexer of the cluster, three additional copies of the bucket are to be stored in the cluster, and the four total copies of the bucket are to be stored across at least three different sites of the five sites. In this manner, by configuring a site replication factor of at least two (2) for a multi-site cluster, the cluster may be able to withstand a failure of one or more entire sites.

Figure 14:
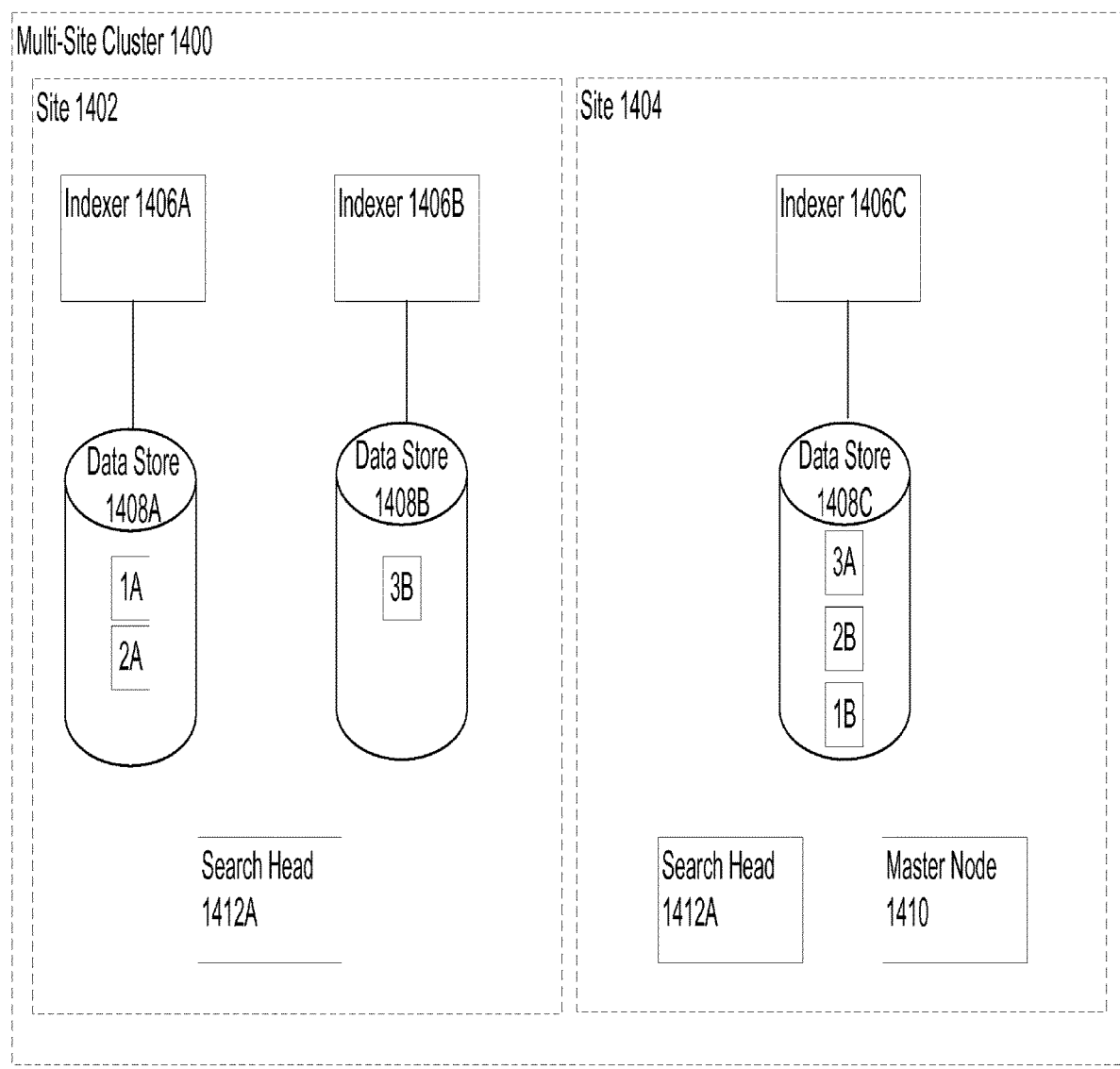
FIG. 14 illustrates an example block diagram of a multi-site clustered data intake and query system, according to an embodiment of the invention.

FIG. 14 illustrates an example of a multi-site cluster 1400 that includes two defined sites: a site 1402 and a site 1404. As indicated above, each of sites 1402, 1404 may represent an individual data center, office building, or other location that houses one or more components of multi-site cluster 1400. Each of indexers 1406A-1406B, data stores 1408A-1408B, and search head 1412 is associated with site 1402. Each of indexer 1406C, data store 1408C, master node 1410, and search head 1412 is associated with site 1404. Two sites are illustrated in FIG. 14 for the purposes of illustrating a clear example; however, a multi-site cluster generally may include any number of sites, and any number of cluster components associated with each site, depending on a particular implementation and a particular user configuration.

Although not depicted, each of indexers 1406A-1406C, data stores 1408A-1408C, master node 1410, and search heads 1412A-1412B may be connected via one or more networks. The networks connected to the cluster components may be implemented by any medium or mechanism that provides for the exchange of data between components of the system 800. Examples of networks that may connect the components of multi-site cluster 1400 include, without limitation, a network such as a Local Area Network (LAN), Wide Area Network (WAN), wireless network, the Internet, Intranet, Extranet, etc. Any number of components within the multi-site cluster 1400 may be directly connected to each other through wired or wireless communication segments.

Figure 15:
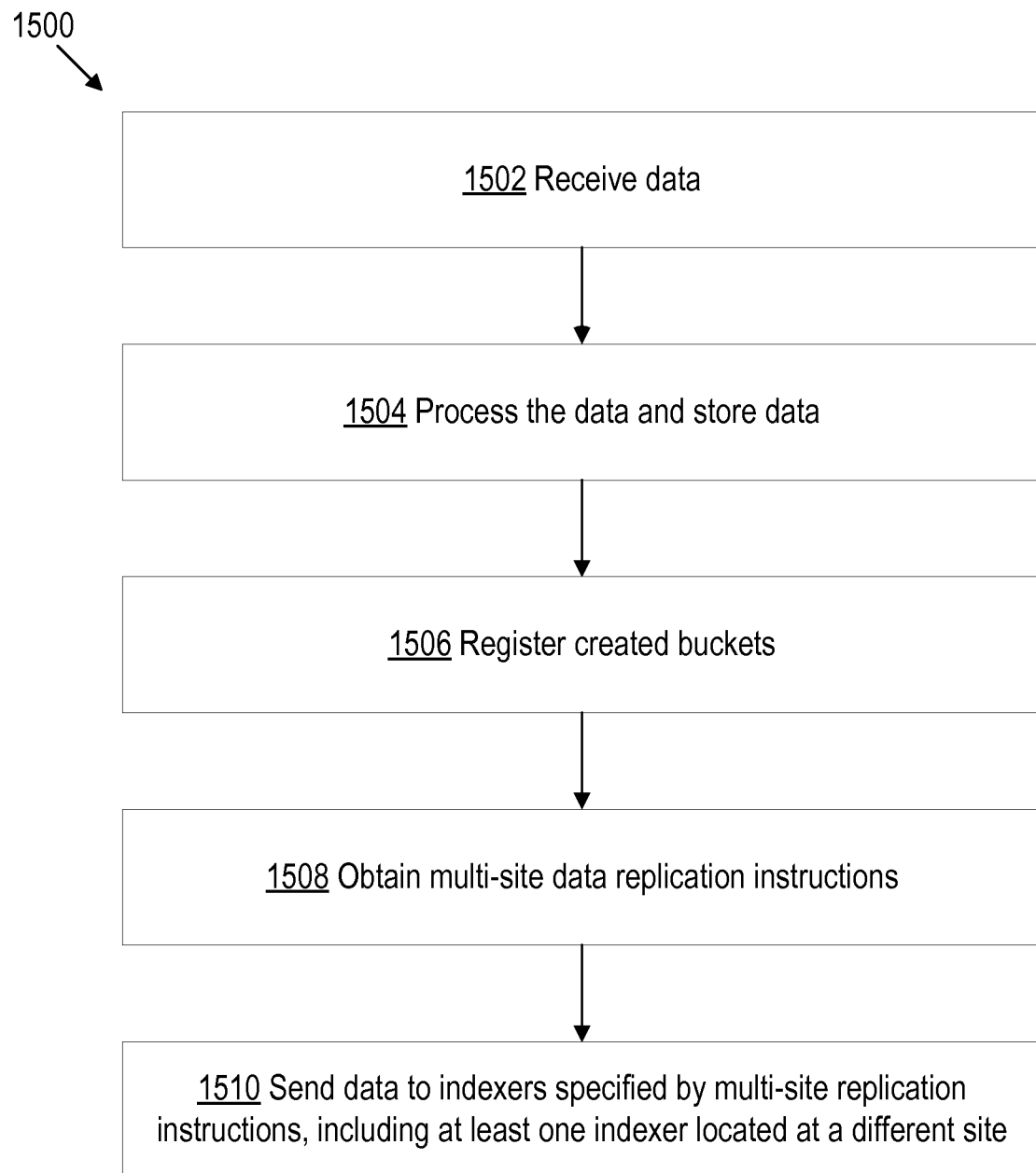
FIG. 15 illustrates a flowchart of a process that indexers may use to process, index, store, and replicate data received from forwarders in a multi-site clustered data intake and query system, according to an embodiment of the invention.

FIG. 15 illustrates a flowchart of a process that indexers may use to replicate data in a multi-site clustered data intake and query system, according to embodiments. In block 1502, an indexer (e.g., one of indexers 1406A-1406C) receives data from a forwarder. At block 1504, the indexer processes and stores the data in a corresponding data store 1408A-1408C. For example, the indexer processing and storing the data may include one or more steps of segmenting, transforming, and indexing the data, as described in reference to FIG. 9.

Figure 16:
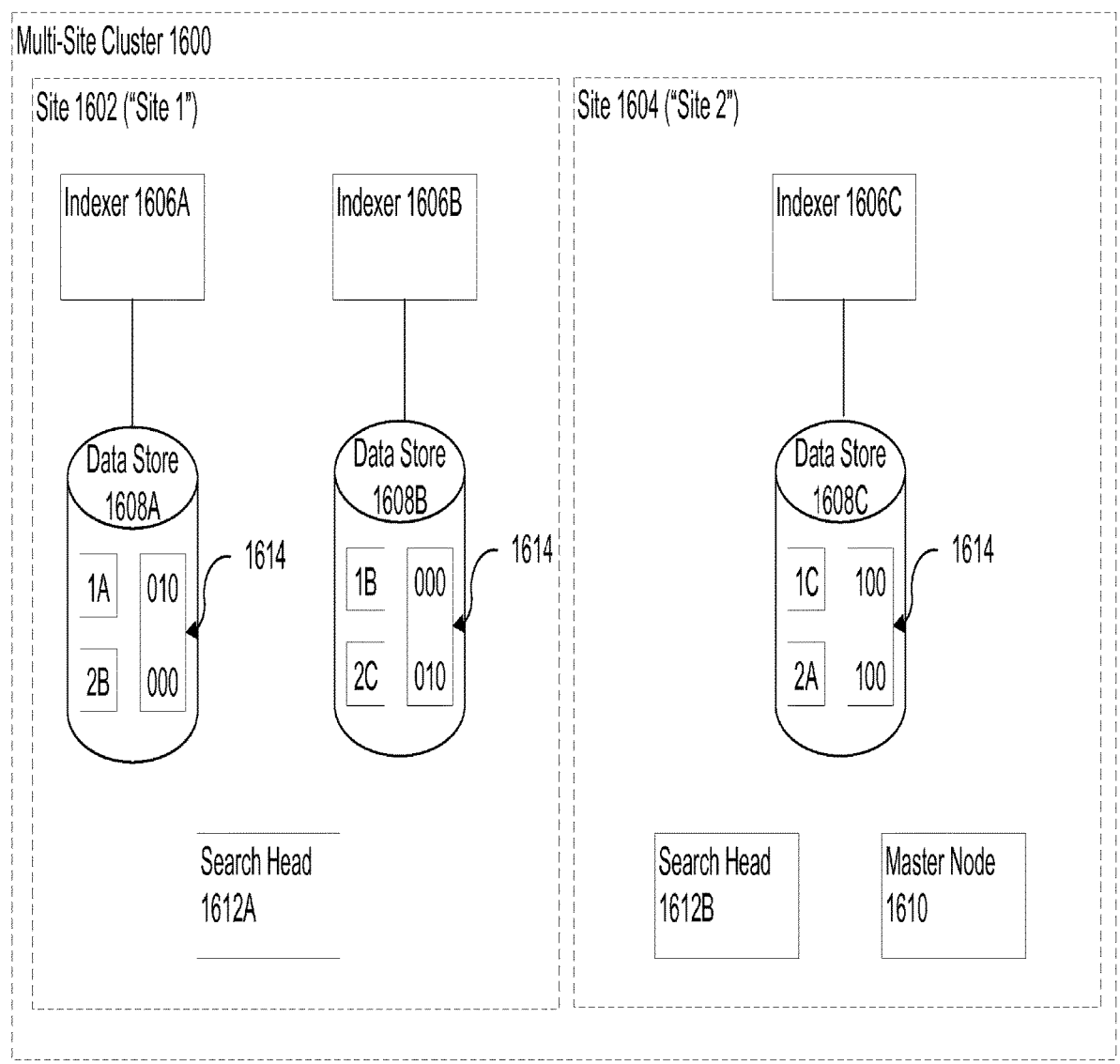
FIG. 16 illustrates an example block diagram of a multi-site clustered data intake and query system that is configured to process search requests based on search affinity information, according to an embodiment of the invention.

At block 1506, the indexer registers any newly created buckets with master node 1410. As depicted in FIG. 16, in a multi-site cluster, master node 1410 may be located at the same site as an indexer, or may be located at a different site. However, in one embodiment, a multi-site cluster includes only one master node 1410. Based on multi-site data replication policy information, master node 1410 determines one or more "peer" indexers within the cluster to store replicated copies of the newly created buckets registered by the indexer. As indicated above, the selected peer indexers may include one or more indexers that are associated with sites that are different from the indexer registering the newly created buckets, depending on a configured site replication factor. The indexer may also receive instructions (e.g., generation information, etc.) indicating whether the indexer has primary responsibility for searching each bucket stored by the indexer.

At block 1508, the indexer obtains multi-site data replication instructions from master node 1410. At block 1510, the indexer sends the data to the peer indexers selected by master node 1410 including at least peer one indexer located at a different site, assuming that a site replication factor of at least two (2) is configured.

To illustrate a particular example of a data replication policy for a multi-site cluster, in FIG. 14 each of data stores 1408A-1408C is illustrated as storing one or more of the buckets labeled 1A, 2A, 1B, 2B, 3A, and 3B. In the example of FIG. 14, the multi-site cluster 1400 may be configured with a multi-site data replication policy that specifies a replication factor of two (2), and is further configured with a site replication factor of two (2). In other words, the example data replication policy configured for multi-site cluster 1400 indicates that each bucket created by an indexer 1406A-1406C is replicated to at least one other indexer, and further, that each bucket is replicated to an indexer that is located at a different site. Similar to FIG. 12, "A" and "B" versions of a bucket represents copies of the same bucket.

For example, indexer 1406A may have received data from a forwarder which indexer 1406A processed and stored in bucket 1A. After registering bucket 1A and based on replication instructions received from master node 1410, indexer 1406A forwarded the data for bucket 1A to peer indexer 1406C which stored a copy of the data as bucket 1B. In the example of FIG. 14, because the data replication policy specifies a site replication factor of two (2), indexer 1406B is not available as a replication target for bucket 1A since creating a copy of bucket 1A at indexer 1406B would not result in two copies of bucket 1A at two different sites. As another example, indexer 1406C may have received data from a forwarder which indexer 1406C processed and stored in the bucket labeled 3A. After registering the 3A bucket and based on received replication instructions, indexer 1406C forwarded the data for bucket 3A to indexer 1406B which stored a copy of the data in the bucket labeled 3B.

The example illustrated in FIG. 14 is only one particular example of a data replication policy for a multi-site cluster and other configurations may be possible. As another example, replicated storage of buckets in a multi-site cluster may be configured in an asymmetric fashion where one site is responsible for storing all primary copies of data and another site is configured as a backup data center. In this case, one may configure the policy so that all but one copy lives on the primary site and the remaining copies on secondary site.

6.0 Site-Based Search Affinity

As indicated above, a multi-site cluster may be configured to replicate data stored by the cluster across indexers located at multiple geographically dispersed sites to increase the fault tolerance of the cluster against site-wide failures, among other benefits. As illustrated in FIG. 14, a multi-site cluster may include multiple sites that each logically group one or more components of the cluster. For example, the components of a multi-site cluster may include one or more search heads and which may be located at one or more of the sites. Because data in a multi-site cluster, and primary responsibility by indexers for that data, may be distributed across indexers located at a number of different sites, a search head may distribute search queries and receive results from indexers located at multiple sites. However, the distribution of search queries to indexers located at multiple geographically dispersed sites may introduce undesirable latency into the search process that is not present when a search head is co-located with all of the indexers of a cluster.

To reduce network traffic and latency when performing searches on data that is stored by indexers located at multiple sites, in one embodiment, a multi-site cluster may be configured such that indexers that are co-located with a search head from which a search query originates are more likely to return any search results that satisfy the query. To cause indexers that are co-located with a search head to be more likely to return search results for queries originating from that search head, in one embodiment, each indexer may store "search affinity" information. Search affinity information indicates, for each bucket stored by a particular indexer and for each site from which a query may originate, whether the particular indexer has primary responsibility for returning search results for that bucket for searches originating at search heads within that site. In other words, whether a given indexer has primary responsibility for returning search results for a particular bucket may depend on the site from which the query originated, and the search infinity information may indicate this for the particular bucket for each possible site from which the query may originate. Search affinity information for a multi-site cluster may be created and maintained by a master node for the cluster, similar to generation information, and may change over time as conditions within the cluster change, as described herein.

In one particular embodiment, search affinity information may be represented by a collection of bitmasks, where each bitmask of the collection is associated with an indexer/bucket pair. For each particular indexer/bucket pair, a bitmask may provide an encoded representation indicating zero or more sites of query origination for which the particular indexer has primary responsibility for responding to search queries for that bucket. For example, a search affinity bitmask may be represented as a string of binary digits, where each individual digit in the string indicates to an indexer whether the indexer has primary responsibility for a bucket for searches originating from a particular site.

As one example, a particular multi-site cluster may consist of three (3) separate sites identified by a number: site 1, site 2, and site 3. To indicate for a particular indexer-bucket pair that the indexer has primary responsibility for the bucket for searches originating from site N, a bitmask may be formed with a value of 1 at the $2^N$ position in the binary string. For example, if a master node determines that an indexer X is to have primary responsibility for a bucket Y for searches originating from site 1 (for example, because indexer X is also located at site 1), the master node may generate a bitmask for the indexer X-bucket Y pair with a 1 in the $2^1$ position (0010). Similarly, if indexer X is to have primary responsibility for bucket Y for searches originating from site 2, the master node may generate a bitmask for the indexer X-bucket Y pair with a 1 in the $2^2$ position (0100), and so forth. If a particular indexer-bucket pair is not to have primary responsibility for searches originating from any site, a master node may generate a bitmask of all zeroes (0000) for the particular indexer-bucket pair.

Although the examples above illustrate bitmasks that indicate that an indexer has primary responsibility for a bucket for searches originating from only a single site, a search affinity bitmask may indicate that an indexer has primary responsibility for a particular bucket for searches originating from multiple sites. For example, an indexer X-bucket Y pair may be associated with a bitmask of 0110, indicating that indexer X has primary responsibility for bucket Y for searches originating from either site 1 or site 2. In general, any combination of search affinity bitmasks may be configured depending on the characteristics of a particular cluster and/or a user configuration.

In an embodiment, search affinity information may be created by a master node and distributed to each indexer of a multi-site cluster for storage by the indexers, similar to distribution of bucket generation information for clusters. Also similar to bucket generation information, search affinity information may change over time as conditions within the cluster change and successive iterations of the search affinity information may be identified by generation identifiers. For example, first search affinity information created by a master node may be identified by a label "generation 0", second search affinity information may be identified by a label "generation 1", and so forth. A master node may create new generations of search affinity information and corresponding generation identifiers in response to a number of different cluster events including, but limited to, any of: the master node initializing, a new indexer joining the cluster, a current indexer failing or leaving the cluster, to rebalance the buckets of a cluster, etc. Indexers may store multiple generations of search affinity information.

In an embodiment, when a search head distributes a search query to indexers of a cluster, the search head may also send a site identifier which indicates the site at which the search head is located. The search head may also distribute a generation identifier that identifies particular search affinity information stored by the indexers. In this manner, when an indexer receives a search from a particular search head, the indexer may use the site identifier and the search affinity information identified by the generation identifier to determine, for each bucket stored by the indexer, whether the indexer has primary responsibility for searches originating from the site identified by the site identifier.

FIG. 16 illustrates an example block diagram of a multi-site clustered data intake and query system that is configured to process search requests based on search affinity information, according to an embodiment. In FIG. 16, a multi-site cluster 1600 includes a site 1602 and a site 1604. Each of sites 1602, 1604 includes one or more of the cluster components including indexers 1606A-1606C, data stores 1608A-1608C, search heads 1612A, 1612B, and a master node 1610.

Each of indexers 1606A-1606C is depicted as storing one or more of the buckets labeled 1A, 1B, 1C, 2A, 2B, and 2C in a corresponding data store 1608A-1608C. Similar to FIG. 12 and FIG. 14, an "A", "B", and "C" version of a bucket represent replicated copies of the same bucket. In the example of FIG. 16, the multi-site cluster 1600 may be configured with a replication factor of three (3) and a site replication factor of two (2). Thus, for example, three separate copies of each of buckets 1 and 2 exist in the cluster and at least two separate copies of each bucket are stored at two different sites In FIG. 16, each of data stores 1608A-1608C is illustrated as storing search affinity information 1614. The search affinity information 1614 may have been received and stored by each indexer, for example, when the indexers 1606A-1606C registered the created buckets with master node 1610, periodically received from master node 1610, and/or the search affinity information 1614 may be included as part of a search query distributed by search head 1612A. As indicated above, in one embodiment, the search affinity information may include a collection of bitmasks for each indexer-bucket pair where each digit of a bitmask represents whether the indexer has primary responsibility for the bucket for searches originating from a particular site. In FIG. 16, only those search affinity identifiers relevant to each indexer are illustrated in each of the data stores 1608A-1608C; however, each indexer may receive and store search affinity identifiers for the entire cluster, or only those search affinity identifiers that are associated with buckets stored by the particular indexer.

Figure 17:
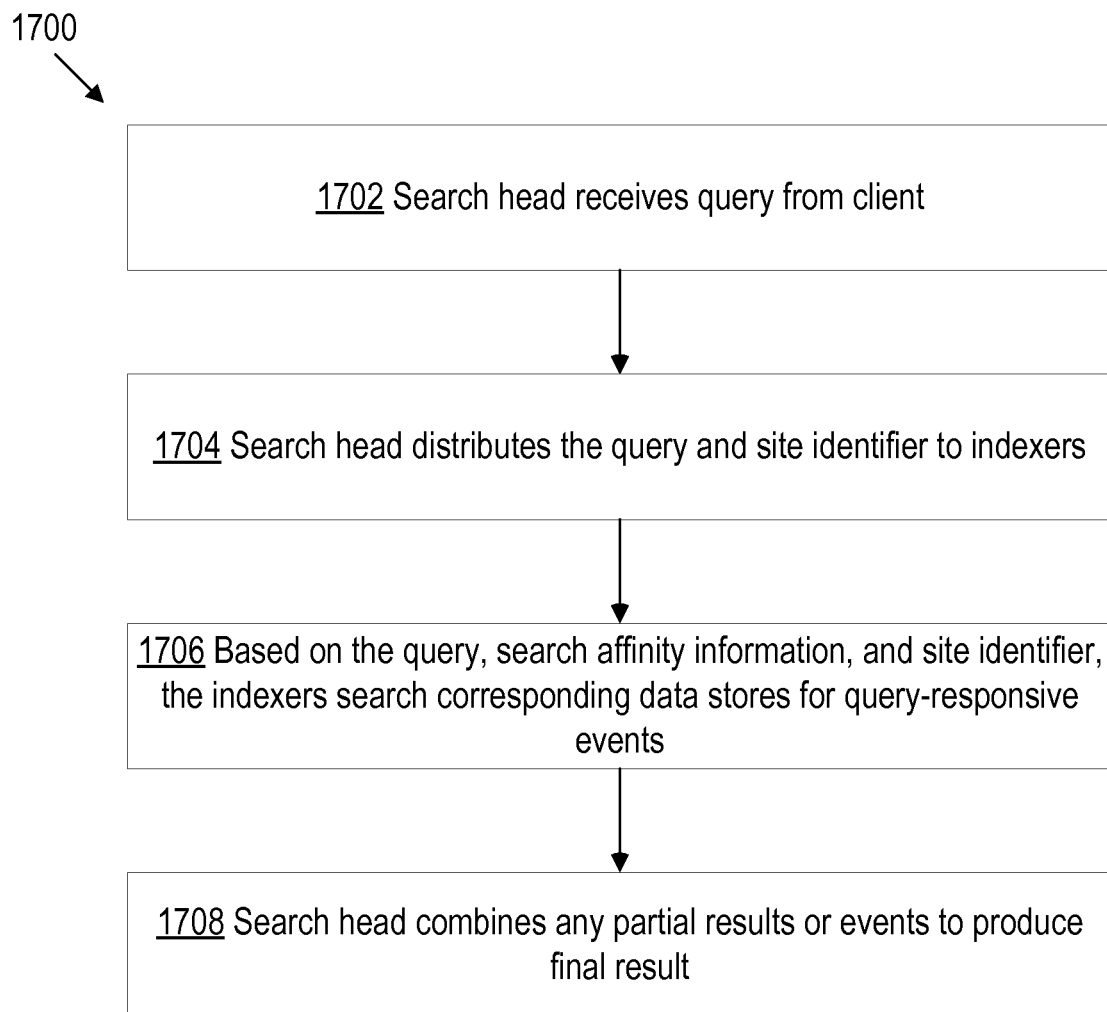
FIG. 17 illustrates a flowchart of an example process that a search head and indexers perform during a search query using search affinity information, according to an embodiment of the invention.

FIG. 17 is a flowchart 1700 of a process that a search head and indexers of a multi-site cluster may perform during a search query according to search affinity information. In block 1702, a search head (e.g., search head 1612A or 1612B) receives a search request from a client. In block 1704, the search head distributes the query and a site identifier to indexers (e.g., indexers 1606A-1606C) of the multi-site cluster. The site identifier indicates the site at which the search head distributing the query is located. The site identifier may be included with the query, or may be sent separately. The search head may also send a generation identifier that identifies particular search affinity information for the indexers to use when processing the query. For example, the indexers may store multiple generations of search affinity information and the generation identifier may identify a particular generation of search affinity information to use for the query.

In block 1706, based on the query, search affinity information, and the site identifier, each of the indexers to which the query was distributed searches a corresponding data store for event results responsive to the query. As indicated above, each indexer may store search affinity information that indicates, for each bucket stored by the indexer, whether the indexer has primary responsibility for the bucket for searches originating from particular sites. The indexers may use the site identifier sent by the search head to determine the originating site of the query for comparison to the search affinity information. For example, if an indexer receives a query and a site identifier indicating that the originating search head is at site 2, the indexer may search buckets that are associated with a bitmask with a 1 in the $2^2$ position (0010).

In block 1708, the search head combines or reduces all of the partial results or events received from the indexers together to determine a final result responsive to the query.

Referring again to FIG. 16, search head 1612A may distribute a search query to indexers 1606A-1606C and include with the query a site identifier of 1. When indexer 1606A receives the search query from search head 1612A, indexer 1606A may consult search affinity information 1614 to determine whether indexer 1606A stores any buckets associated with a bitmask having a value of 1 in the $2^1$ position (010). For example, indexer 1608A may determine that bucket 1A is associated with a bitmask having a 1 in the $2^1$ position. Thus, in response to the query from search head 1612A, indexer 1606A may return one or more event results from bucket 1A if any of the data in bucket 1A is responsive to the search query. Similarly, because bucket 2B is associated with a bitmask that includes a 0 in the $2^1$ position, indexer 1606A does not return any results from bucket 2B, even if bucket 2B contains event results that are responsive to the query.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

7.0 Implementation Mechanisms—Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 18:
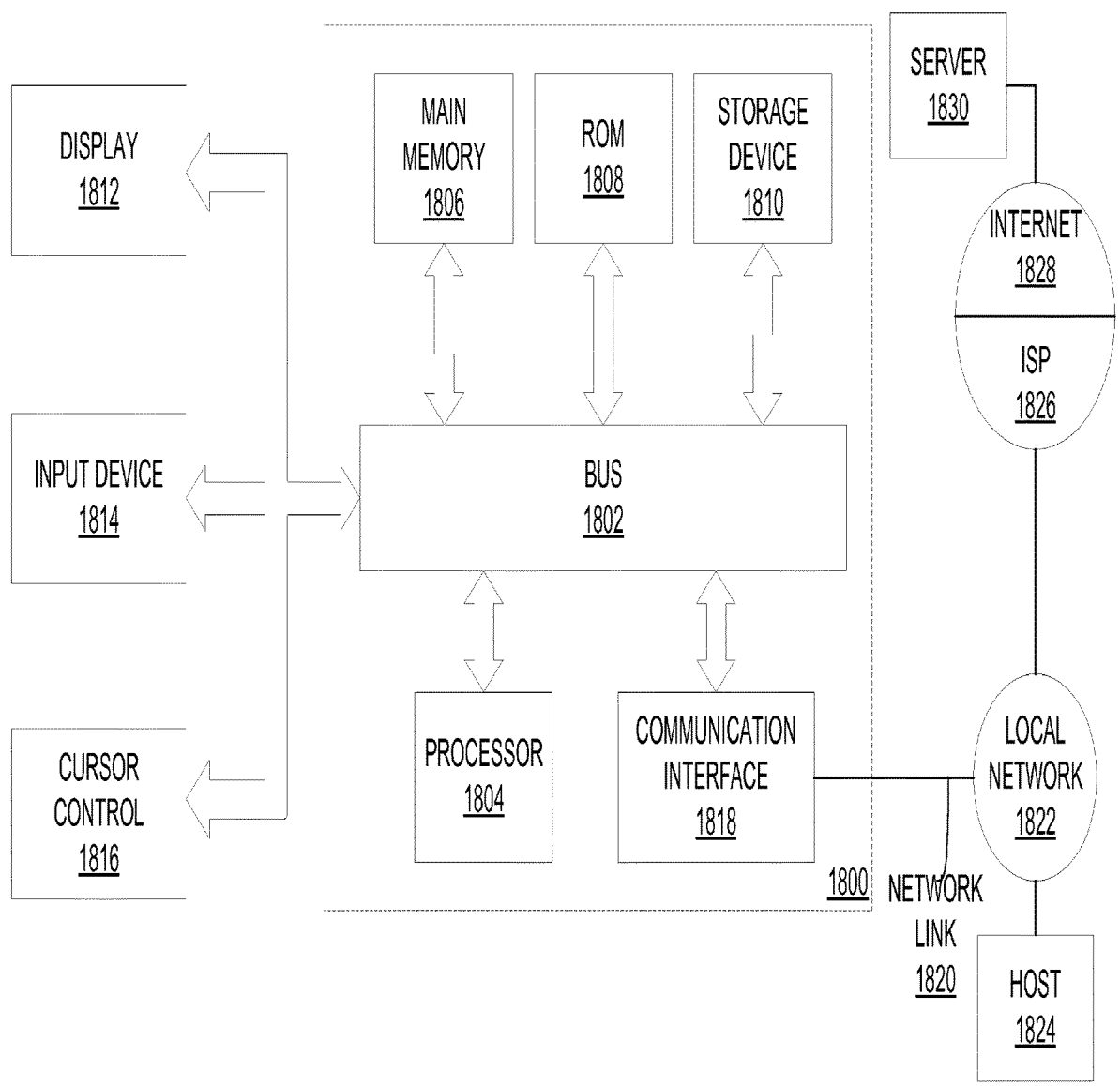
FIG. 18 illustrates a computer system upon which an embodiment may be implemented.

For example, FIG. 18 is a block diagram that illustrates a computer system 1800 upon which an embodiment may be implemented. Computer system 1800 includes a bus 1802 or other communication mechanism for communicating information, and a hardware processor 1804 coupled with bus 1802 for processing information. Hardware processor 1804 may be, for example, a general purpose microprocessor.

Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Such instructions, when stored in non-transitory storage media accessible to processor 1804, render computer system 1800 into a special-purpose machine that is customized to perform the operations specified in the instructions.

Computer system 1800 further includes a read only memory (ROM) 1808 or other static storage device coupled to bus 1802 for storing static information and instructions for processor 1804. A storage device 1810, such as a magnetic disk, optical disk, or solid-state drive is provided and coupled to bus 1802 for storing information and instructions.

Computer system 1800 may be coupled via bus 1802 to a display 1812, such as a cathode ray tube (CRT), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

Computer system 1800 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 1800 in response to processor 1804 executing one or more sequences of one or more instructions contained in main memory 1806. Such instructions may be read into main memory 1806 from another storage medium, such as storage device 1810. Execution of the sequences of instructions contained in main memory 1806 causes processor 1804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1810. Volatile media includes dynamic memory, such as main memory 1806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 1804 for execution. For example, the instructions may initially be carried on a magnetic disk or solid-state drive of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card, cable modem, satellite modem, or a modem to provide a data communication connection to a corresponding type of telephone line. As another example, communication interface 1818 may be a local area network (LAN) card to provide a data communication connection to a compatible LAN. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818.

The received code may be executed by processor 1804 as it is received, and/or stored in storage device 1810, or other non-volatile storage for later execution.

8.0 Example Embodiments

In an embodiment, a method or non-transitory computer readable medium comprises: receiving, at an indexer, a set of search affinity identifiers, each search affinity identifier indicating, for each of a plurality of sites from which a query may originate, whether the indexer has primary responsibility for responding to queries from that site for a particular subset of data accessible to the indexer; receiving, from a first search head, (i) a first query to search a subset of data accessible to the indexer, and (ii) a first site identifier identifying a first site at which the first search head is located; determining, based on both the first site identifier and a particular search affinity identifier of the set of search affinity identifiers, that the indexer is to respond to the first query with a result from searching the subset of data; sending, to the first search head, the result from searching the subset of data.

In an embodiment, the method or computer readable medium further comprises: wherein determining that the indexer is to respond to the first query with a result from searching the subset of data includes determining that the indexer has primary responsibility for responding to queries for the subset of data for the first site.

In an embodiment, the method or non-transitory computer readable medium further comprises: receiving, at the indexer, a second query from a second search head to search the subset of data, the second query including a second site identifier identifying a second site at which the second search head is located; determining, based on both the second site identifier and the particular search affinity identifier of the set of search affinity identifiers, that the indexer is not to respond to the second query with a result from searching the subset of data; wherein each of the first site and the second site represents a collection of computing resources located at a different geographic location from the other site.

In an embodiment, the method or non-transitory computer readable medium further comprises: wherein the particular search affinity identifier is a bitmask, and wherein each digit of the bitmask represents a particular site of a plurality of sites.

In an embodiment, the method or non-transitory computer readable medium further comprises: receiving, at the indexer, a second query from a second search head to search the subset of data, the second query including a second site identifier identifying a second site at which the second search head is located; determining, based on both the second site identifier and the particular search affinity identifier of the set of search affinity identifiers, that the indexer is not to respond to the second query with a result from searching the subset of data; wherein the first query and the second query are identical.

In an embodiment, the method or non-transitory computer readable medium further comprises: receiving, at the indexer, a second query from a second search head to search the subset of data, the second query including a second site identifier identifying a second site at which the second search head is located; determining, based on both the second site identifier and the particular search affinity identifier of the set of search affinity identifiers, that the indexer is not to respond to the second query with a result from searching the subset of data; wherein the first query and the second query are different.

In an embodiment, the method or non-transitory computer readable medium further comprises: receiving, at the indexer, raw data; separating the raw data into a plurality of events included in the subset of data; determining, for each event in the plurality of events, a time stamp; and storing the subset of data in a data store.

In an embodiment, the method or non-transitory computer readable medium further comprises: receiving, at the indexer, raw data; separating the raw data into a plurality of events included in the subset of data; storing the subset of data in a data store; identifying a replication factor that indicates a number of times that the subset of data is to be replicated; and sending the subset of data to a number of other indexers, wherein the number corresponds to the replication factor.

In an embodiment, a method or non-transitory computer readable medium comprises: receiving, at the indexer, raw data; separating the raw data into a plurality of events included in the subset of data; storing the subset of data in a data store; identifying a site replication factor that indicates a number of sites at which the subset of data is to be replicated; and sending the subset of data to second indexers located at the number of sites.

In an embodiment, a method or non-transitory computer readable medium comprises: wherein the set of search affinity identifiers is associated with a first generation identifier; receiving, at the indexer, a second set of search affinity identifiers associated with a second generation identifier.

In an embodiment, a method or non-transitory computer readable medium comprises: wherein the indexer stores a plurality of sets of search affinity identifiers, and wherein each set of search affinity identifiers of the plurality of sets of search affinity identifiers is associated with a generation identifier; receiving, from the first search head, a particular generation identifier identifying the particular set of search affinity identifiers of the plurality of sets of search affinity identifiers.

In an embodiment, a method or non-transitory computer readable medium comprises: receiving data at an indexer associated with a first site; storing, by the indexer, at least one grouped subset of the data in a data store accessible by the indexer; receiving data replication instructions including a list of one or more peer indexers, the one or more peer indexers including at least one peer indexer associated with a second site; and sending the at least one grouped subset of the data to the one or more peer indexers; receiving instructions indicating whether the indexer has primary responsibility for searching in the data store to which the indexer has access the at least one grouped subset of the data.

In an embodiment, the method or non-transitory computer readable medium further comprises: wherein one or more peer indexers include peer indexers located at a number of sites, and wherein the number of sites corresponds to a site replication factor.

In an embodiment, the method or non-transitory computer readable medium further comprises: wherein each of the first site and the second site represents a collection of computing resources located at a different geographic location from the other site.

In an embodiment, the method or non-transitory computer readable medium further comprises: wherein sending the at least one grouped subset of the data to the one or more peer indexers causes the one or more peer indexers to store the at least one grouped subset of the raw data in one or more separate data stores.

In an embodiment, the method or non-transitory computer readable medium further comprises: separating the data into a plurality of events, and wherein the at least one grouped subset of the data includes one or more of the plurality of events.

In an embodiment, the method or non-transitory computer readable medium further comprises: wherein the at least one grouped subset corresponds to a particular time span.

In an embodiment, the method or non-transitory computer readable medium further comprises: sending to each peer indexer to which data is replicated, based on the replication instructions, an indication of whether the peer indexer is to store a searchable or non-searchable copy of the data.

In an embodiment, the method or non-transitory computer readable medium further comprises: wherein the replication instructions specify a number of peer indexers for replicating the data, and wherein the number of peer indexers corresponds to a user configured replication factor.

In an embodiment, the method or non-transitory computer readable medium further comprises: receiving generation information indicating whether the indexer has primary responsibility for responding to queries for the at least one grouped subset of the data, and wherein the generation information is associated with a generation identifier.

In an embodiment, the method or non-transitory computer readable medium further comprises: wherein the instructions include search affinity information indicating whether the indexer has primary responsibility for responding to queries originating from the first site for the at least one grouped subset of the data, and wherein the search affinity information is associated with a generation identifier.

9.0 Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

In drawings, various system components are depicted as being communicatively coupled to various other components by arrows. These arrows illustrate only certain examples of information flows between the components of the depicted systems. Neither the direction of the arrows nor the lack of arrow lines between certain components should be interpreted as indicating the absence of communication between the certain components. Indeed, each component of the depicted systems may feature an open port, API, or other suitable communication interface by which the component may become communicatively coupled to other components of the depicted systems as needed to accomplish any of the functions of the systems described herein.

What is claimed is:

1. A method, comprising:
receiving, at a selected indexer within a plurality of indexers in a cluster, data from a forwarder indexer, wherein the selected indexer is designated as a primary indexer for the data, wherein the primary indexer is operable to respond to search queries pertaining to the data, wherein the cluster comprises a plurality of sites, wherein each site of the plurality of sites comprises a subset of the plurality of indexers;
receiving, at the selected indexer, data replication instructions from a master node of the cluster, wherein the data replication instructions identify a number of other indexers in the cluster for storing a replicated copy of the data determined in accordance with a replication factor configured for the cluster, and wherein the data replication instructions further identify a number of sites from the plurality of sites across which to store the replicated copy of the data determined in accordance with a site replication factor; and transmitting, from the selected indexer, the data to the other indexers for replication.

2. The method of claim 1, wherein the replication factor and the site replication factor are included in the data replication instructions.

3. The method of claim 1, wherein each site of the plurality of sites is associated with a separate geographical location.

4. The method of claim 1, wherein, for each of the other indexers, the data replication instructions indicate whether a respective indexer is to store a searchable copy of the data.

5. The method of claim 1, wherein each site of the plurality of sites is associated with a separate geographical location, and wherein at least one of the other indexers is located at a different site from the plurality of sites than the selected indexer.

6. The method of claim 1, wherein, for each of the other indexers, the data replication instructions indicate whether a respective indexer is to store a searchable copy of the data, and wherein further a number of searchable copies to be replicated on the other indexers is determined in accordance with a search factor configured for the cluster.

7. The method of claim 1, wherein, for each of the other indexers, the data replication instructions indicate whether a respective indexer is to store a searchable copy of the data, and wherein further the searchable copy of the data comprises index files, wherein the index files are operable to be searched in response to search requests.

8. The method of claim 1, wherein, for each of the other indexers, the data replication instructions indicate whether a respective indexer is to store a searchable copy of the data, and wherein the respective indexer generates the searchable copy of the data by processing the data to generate a separate keyword index.

9. The method of claim 1, wherein the forwarder indexer is one of a plurality of forwarder indexers, each forwarder indexer operating independent of each other forwarder indexer to select an indexer as a primary indexer for data sent to the cluster by a respective forwarder indexer of the plurality of indexers.

10. The method of claim 1, wherein the site replication factor is based on one of a type of data to be replicated and information from a forwarder indexer.

11. The method of claim 1, wherein at least one indexer in the plurality of indexers is designated as a secondary indexer for the data and as a primary indexer for different data.

12. The method of claim 1, wherein the data replication instructions are generated by the master node in accordance with a data replication policy for the cluster.

13. The method of claim 1, wherein the other indexers are determined by the master node of the cluster based on load balancing criteria.

14. The method of claim 1, wherein the selected indexer is designated as a primary indexer for the data at a specified generation identifier, and wherein the other indexers are each designated as secondary indexers for the data at the specified generation identifier.

15. The method of claim 1, wherein the selected indexer is designated as a primary indexer for the data at a specified generation identifier, wherein the other indexers are each designated as secondary indexers for the data at the specified generation identifier, and further wherein for a given query request for the data at the specified generation identifier received by each of the indexers in the cluster, the primary indexer for the data at the specified generation identifier responds to the query request, and each secondary indexer for the data at the specified generation identifier ignores the request.

16. The method of claim 1, wherein the selected indexer is designated as a primary indexer for the data at a specified generation identifier, and wherein the other indexers are each designated as secondary indexers for the data at the specified generation identifier, and wherein further the master node of the cluster is configured to assign the specified generation identifier to the data, and further is configured to select at least one of the secondary indexers to become a new primary indexer of the data when the primary indexer for the specified generation identifier is determined to be non-responsive.

17. The method of claim 1, wherein the transmitting the data to the other indexers for replication comprises transmitting the data with a journal comprising metadata useable to recreate the data.

18. The method of claim 1, wherein each indexer of the plurality of indexers stores search affinity information, which indicates, for each subset of data stored by a respective indexer and for each site from which a query originates, whether the respective indexer has primary responsibility for returning search results for a respective subset of data.

19. A non-transitory computer-readable medium storing computer-executable instructions which, when executed by a processor, cause the processor to perform operations comprising:

receiving, at a selected indexer within a plurality of indexers in a cluster, data from a forwarder indexer, wherein the selected indexer is designated as a primary indexer for the data, wherein the primary indexer is operable to respond to search queries pertaining to the data, wherein the cluster comprises a plurality of sites, wherein each site of the plurality of sites comprises a subset of the plurality of indexers;

receiving, at the selected indexer, data replication instructions from a master node of the cluster, wherein the data replication instructions identify a number of other indexers in the cluster for storing a replicated copy of the data determined in accordance with a replication factor configured for the cluster, and wherein the data replication instructions further identify a number of sites from the plurality of sites across which to store the replicated copy of the data determined in accordance with a site replication factor; and transmitting, from the selected indexer, the data to the other indexers for replication.

20. A system comprising:

at least one memory storing computer-executable instructions; and at least one processor, wherein the at least one processor is configured to access the at least one memory and to execute the computer-executable instructions to:

receive, at a selected indexer within a plurality of indexers in a cluster, data from a forwarder indexer, wherein the selected indexer is designated as a primary indexer for the data, wherein the primary indexer is operable to respond to search queries pertaining to the data, wherein the cluster comprises a plurality of sites, wherein each site of the plurality of sites comprises a subset of the plurality of indexers;

receive, at the selected indexer, data replication instructions from a master node of the cluster, wherein the data replication instructions identifies a number of other indexers in the cluster for storing a replicated copy of the data determined in accordance with a replication factor configured for the cluster, and wherein the data replication instructions further identifies a number of sites from the plurality of sites across which to store the replicated copy of the data determined in accordance with a site replication factor; and transmit, from the selected indexer, the data to the other indexers for replication.

* * * * *